United States Patent
Einav et al.

(10) Patent No.: US 7,913,935 B2
(45) Date of Patent: Mar. 29, 2011

(54) IN-LINE MINI SPRINKLERS SYSTEM AND METHOD AND APPARATUS FOR MAKING SAME

(75) Inventors: Zvika Einav, Kibbutz Gvat (IL); Zvi Golan, Kibbutz Gvat (IL)

(73) Assignee: Plastro Irrigation Systems Ltd., Kibbutz Gvat (IL)

( * ) Notice: Subject to any disclaimer, the term of this patent is extended or adjusted under 35 U.S.C. 154(b) by 641 days.

(21) Appl. No.: 11/816,323

(22) PCT Filed: Feb. 21, 2006

(86) PCT No.: PCT/IL2006/000223
§ 371 (c)(1),
(2), (4) Date: Oct. 7, 2007

(87) PCT Pub. No.: WO2006/087726
PCT Pub. Date: Aug. 24, 2006

(65) Prior Publication Data
US 2008/0257991 A1    Oct. 23, 2008

(30) Foreign Application Priority Data
Feb. 21, 2005   (IL) .......................................... 167015

(51) Int. Cl.
*B65H 75/00* (2006.01)
*A01G 25/02* (2006.01)
*B05B 1/32* (2006.01)
*B05B 15/00* (2006.01)
*B05B 1/30* (2006.01)

(52) U.S. Cl. ........ 239/547; 239/196; 239/269; 239/452; 239/533.1; 239/542; 239/550; 239/570

(58) Field of Classification Search .................... 239/11, 239/271, 272, 451, 452, 453, 459, 533.1, 239/533.13, 533.14, 542, 547, 550, 553, 239/562, 566, 570, 575, 576, 588, 600; 285/5
See application file for complete search history.

(56) References Cited

U.S. PATENT DOCUMENTS

| | | | | |
|---|---|---|---|---|
| 2,628,865 A | * | 2/1953 | Duncan, Jr. | 239/458 |
| 2,693,203 A | | 11/1954 | Hempel | |
| 3,794,294 A | * | 2/1974 | Sherman | 251/145 |
| 3,837,619 A | | 9/1974 | Sherman | |
| 3,981,452 A | | 9/1976 | Eckstein | 239/542 |

(Continued)

OTHER PUBLICATIONS

International Search Report for PCT/IL2006/000223 dated Dec. 6, 2006 (3 pages).

(Continued)

*Primary Examiner* — Len Tran
*Assistant Examiner* — Ryan Reis
(74) *Attorney, Agent, or Firm* — Fennemore Craig, P.C.

(57) ABSTRACT

An in-line system of mini sprinklers comprising a tubular conduit having inner and outer surface areas, and fitted for the flow of pressurized liquids. This tubular conduit has one or more openings along its length, and at least one mini sprinkler unit embedded within the tubular conduit at each opening. Each mini sprinkler unit comprises a liquid distributing assembly and biasing means. As pressure within the tubular conduit increases, inward force exerted by the biasing means is overcome, and the liquid distributing assembly moves outward. As the liquid distributing assembly protrudes beyond the outer surface of the tubular conduit, liquid escapes and sprinkles onto the ground. As pressure is decreased within the tubular conduit, the biasing means force the liquid distributing assembly back to its original position.

29 Claims, 13 Drawing Sheets

U.S. PATENT DOCUMENTS

| | | | | |
|---|---|---|---|---|
| 4,123,006 A | * | 10/1978 | Yukishita | 239/266 |
| 4,132,364 A | | 1/1979 | Harmony | 239/542 |
| 4,134,550 A | * | 1/1979 | Bright, Sr. | 239/542 |
| 4,190,232 A | | 2/1980 | Clements | |
| 4,380,318 A | | 4/1983 | Curry | 239/533.13 |
| 4,728,042 A | | 3/1988 | Gorney et al. | 239/542 |
| 4,739,973 A | | 4/1988 | Herndon | 266/101 |
| 4,889,287 A | | 12/1989 | Hemsley et al. | 239/498 |
| 5,022,940 A | | 6/1991 | Mehoudar | 156/64 |
| 5,163,618 A | * | 11/1992 | Cordua | 239/205 |
| 5,522,551 A | | 6/1996 | DeFrank et al. | 239/542 |
| 5,931,389 A | | 8/1999 | Clavel | 239/542 |
| 6,581,854 B2 | | 6/2003 | Eckstein et al. | 239/542 |
| 6,942,166 B2 | * | 9/2005 | Tanimoto | 239/547 |

OTHER PUBLICATIONS

Written Opinion of the International Searching Authority for PCT/IL2006/000223 dated Dec. 6, 2006 (4 pages).

International Preliminary Report on Patentability for PCT/IL2006/000223 dated Aug. 21, 2007 (5 pages).

Supplementary European Search Report for European Application No. 06711205.2 dated Feb. 18, 2010 (2 sheets).

* cited by examiner

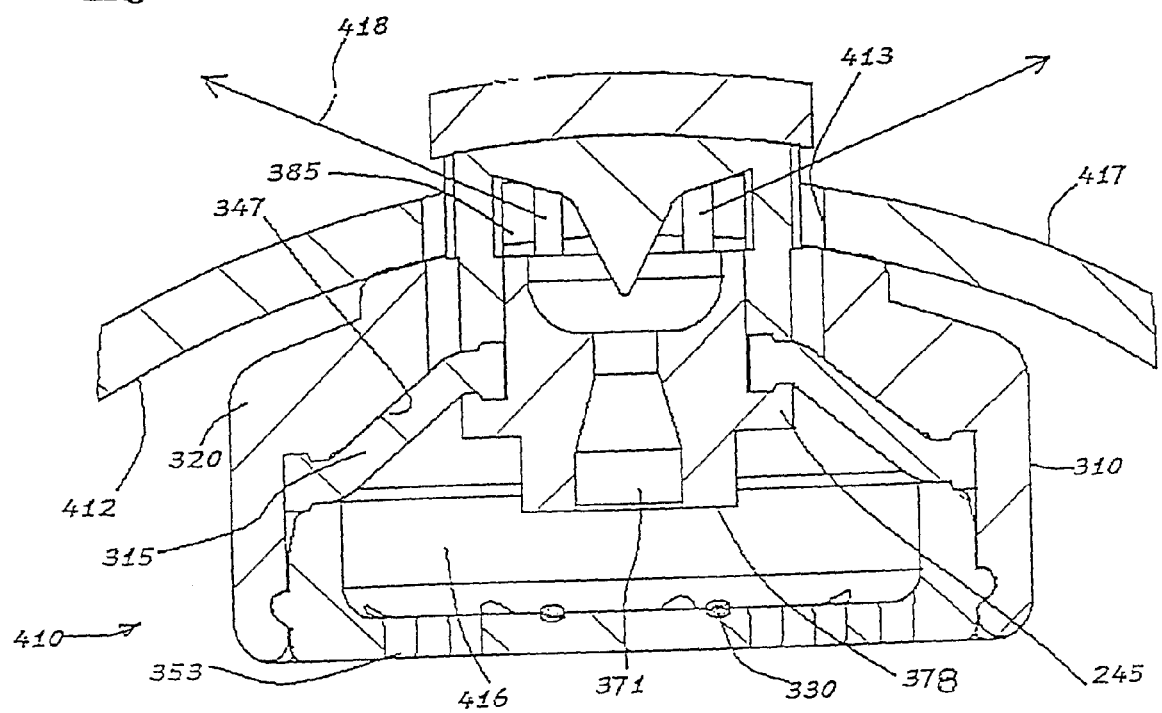

IN-LINE MINI SPRINKLERS SYSTEM AND METHOD AND APPARATUS FOR MAKING SAME

RELATED APPLICATION DATA

This application is the U.S. national stage of PCT/IL2006/000223 filed on Feb. 21, 2006, which is based on and claims the benefit of Israeli Patent Application No. 167015 filed on Feb. 21, 2005, the content of each which is expressly incorporated herein in its entirety by this reference.

FIELD OF THE INVENTION

The invention relates to the domain of irrigation, including agricultural irrigation and flushing (rinsing) areas or wetting surfaces, and fundamentally—in the field of irrigation systems of low volumes, employing mini sprinklers, and the methods for manufacturing these systems.

BACKGROUND OF THE INVENTION

Irrigation in low volumes is noted and well known in the domain of modern agricultural irrigation. In general, the subject is an irrigation method designated to deliver the water to a specified and as accurate as practical to a defined area, with correct time and simultaneously providing nutrients (fertilizing) materials to the plants together with the water, at the correct dosage and concentration. The common range of pressures and throughput rates of the water in low volume irrigation is 0.5 to 4 atmospheres and 1 to 200 liters per hour.

There are two major low volume irrigation methods—drip irrigation and irrigation by sprinkling.

The drip irrigation method is based on a system of drip emitters. It is possible to describe a drip emitter as a device accepting water under pressure. The drip emitter reduces the water pressure by directing the water flow through a mechanical mechanism where it encounters resistance to the flow. For example, passing the water through a flow passage formed with a labyrinth of pointed/sharp barriers (set of baffles) positioned in the flow path of the water. The barrier's labyrinth abates and reduces the water pressure. Thus, following it "journey" through the drip emitter, the water at reduced pressure exits the drip emitter as a dripping current.

The advantages of using low volume irrigation through drip emitters, lies in the fact that it brings the water to very accurate designated locations. It also enables providing exact dosages of water and fertilizers, and the drip emitter system can be hidden preventing physical damage to the system combined with inhabiting herbage growth.

The disadvantages of using low volume irrigation through drip emitters, is its "pointed" mode of irrigation. Considering its cross section, the wetted volume resembles an "onion" shaped volume that only its relatively small upper (top) layer is located at the upper ground level. But it is this specific layer that is reckoned as critical for developing the roots system of the plants—which is the layer that should be irrigated (as it is richer in fertilizers contents and oxygen percentages). In order to overcome this drawback, farmers tend to increase the number of drip emitters per area unit. This solution—increasing the density of branches and of drip emitters per branch, obviously reduces the advantage of employing the drip emitters method, because the quantity of required equipment increases significantly (and also the deployment tasks become more costly and difficult).

A known and noted product in the domain of low volume irrigation by drip emitters is an "Integral Drip Line", the so-called "In-Line Drip Line". This is a tubular conduit, that simultaneously with its production process (for example, by a continuous extruding process as a tubular profile or made up from two sheets that are connected flush one to the other at the edges, resulting in a tube with two seams or formed as a tube from a folded sheet that is eventually made as a tube with one seam—along its length), drip emitters units being included within it and embedded in it, located along its length with selected gaps between each and its adjacent members.

In an "Integral Drip Line" or in other words—"In-Line Drip Line", the drip emitter units might be cylindrical (and in this case they are implanted within the tube in all their circumferential area—see for example Eckstein's U.S. Pat. No. 3,981,452), or flat (and then they are fixed to the inner surface of the tube only in part of their circumferential area), (see for example Gorney et al's U.S. Pat. No. 4,728,042).

Exact opening of apertures ("openings") in the tube, exactly at the appropriate locations, namely exactly facing the water exits that are formed in the drip emitter units located in the tube along its length, complete the process of producing the integral drip line. Thus, the water flowing within the tube, are shed from it at the appropriate locations, dripping as required.

Processes and means for manufacturing integral drip lines simultaneously with the manufacturing process of the tube are familiar and known since long ago. (see for example Mehoudar's U.S. Pat. No. 5,022,940 covering manufacture of integral drip line in a continuous extruding process of a tubular profile and DeFrank's et al U.S. Pat. No. 5,522,551 relating to manufacturing integral drip lines from a sheet folded to eventually form a tube with a seam).

An outstanding advantage of the integral drip line is the ease of operating it in the field. Deploying the integral drip line and collecting it back (as a large coil) is done with relative ease. The structure of the system also protects the emitter units against physical damage (as they are embedded within the tube and not protruding from it). Because of this advantage, more and more farmers are switching over to irrigation with integral drip lines. Aided by suitable mechanization means, deploying the tubes is done efficiently and all the farmer has to do is to connect it to a water source and close its other end.

As we have pointed above, installation of the integral drip line for operation in the field might be mechanized, and hence efficient and at low cost, but the integral drip line do not offer an answer to the problem we posed above—namely the drawback of missing the localized irrigation, namely the deterrent small area on the ground that is wetted by the drip emitters.

Referring to FIG. 1a, FIG. 1a is an illustration of existing prior art as cited above, relating to low volume irrigation by employing a sector of integral drip line 10 that is laid on the ground (marked by line 15). Drip emitters 20 and 25 embedded within tube 10 at the time of its production (illustrated by dashed lines) form wetting patterns inside the ground, in the image of "onions" 30 and 35. The relatively small wetted areas on the ground surface wetted by the drip emitters are seen rather distinctively. On the other hand, the relative ease and simplicity of deploying the system, i.e., extending tube 10 on the ground is self-evident.

As cited, there is an additional common method in use for low volume irrigation—irrigation by sprinkling. Irrigation by sprinkling is based on using systems of mini sprinklers. A mini sprinkler is a device relatively complicates (a sprinklers' post might be assembled from five to ten parts). Mini sprinklers are described, for example, in Hemsley et al's U.S. Pat. No. 4,889,287.

The farmer is required to deploy a water supply hose in the intended location. Then, he installs the posts for the sprinklers along the hose and in close proximity. Generally, the farmer receives the sprinklers' posts already in their assembled state, and is required to stabilize them on the ground near the water hose he deployed on the ground, for example—by tying them to a pegs driven into the ground or by tying the sprinklers unto a wire that was laid beforehand. Additional tasks that the farmer has to perform are prying holes in the water hose and connect the sprinklers posts to provide a water passage from the hose to the sprinklers.

The advantages of the low volume irrigation by mini sprinklers, is that it wets—simultaneously, a relatively large area on the upper ground surface, and hence exploits in an optimal mode the ground upper layer that is best suited for developing the roots. If the farmer manages to deploy the sprinkler's post at beneficial gaps one from each other, correctly allowing for weighting the water supply rates versus water losses (due to winds, and evaporation to the air) then on the ground—the wetted area that would be obtained, would nor be a collection of separate localized points (as would have been obtained for low volume irrigation using drip emitters), but rather a relatively large assemblage of wetted surfaces that together combine to one large area sector. Instead of the former mentioned "onion" like cross section (as would have been obtained for low volume irrigation using drip emitters), a wide wetted area would be provide, that would prompt a better roots development in the critical ground layer, combined with a more efficient rinsing and driving away salts that accumulate in the ground surface (especially in dray air areas). Thus a micro weather change to the better would be generated—through reducing the temperature and increasing the humidity below the vegetation growth scene, and generating a growth environment that hides the fertilizers spread on the ground.

On the other hand, the drawbacks of the low volume irrigation by the mini sprinklers method, lies in the relative complicity required for performing the multi stages installation of the system correctly and efficiently (as we enumerated: deploying the water hose, installing and anchoring the sprinkler's posts at its vicinity and with suitable gaps between them, connecting water piping from the hose to the sprinklers). Naturally, from the complications linked to the installation, we can understand the costs issue facing the farmer. Deploying the sprinklers system in the field is not mechanized and thus neither efficient nor cheap. The sprinklers assemblage is exposed to the environment and also to physical harm, and disassembling it requires all the above mentioned complicated steps (done backwards: disconnecting the water supply, dismantling the sprinklers from the posts, disassembling each post separately).

Referring to FIG. 1b. FIG. 1b displays prior art, regarding the execution of low volume irrigation using the mini sprinkler units system 50. A water hose 55 is deployed at the intended destination on the ground surface (marked by line 60). The farmer installs the sprinklers 65 and 70, along and in the proximity of hose 30. In the illustrated example, sprinklers 65 and 70 are stabilized on pegs 75 and 80, respectively, that are driven into the ground. Water hose 55 is perforated and connected, through tubes 85, 90 respectively, in order to provide a water flow into the sprinklers. Sprinklers 65 and 70 generate by their concurrent action, circumferential wetted sectors 95 and 100, which cover a relatively large area on the upper ground surface. On the ground, the wetted area that would be received from the system 50, would not be a collection of localized points (as would have been obtained for low volume irrigation using drip emitters, see FIG. 1a), but rather an array of wetted areas that together form a relatively large wide and continuous volume. On the other hand, the complications linked to the deployment and dismantling of the system on all the required stages, depict the difficulties clearly and unequivocally.

A wide and continuous wetted volume is also required in additional applications, that are not necessarily agricultural, in which use is made of low volume irrigation systems. For example—a method for rinsing minerals (heap leaching) by using solutions that are distributed by sprinklers or spread through drip emitters, (for example, on the heaps of material that was dug from a mine), (see for example Herndon's U.S. Pat. No. 4,739,973). Any professional experienced in this field would understand that the workers in a mine that wish to use existing systems such as reviewed above (sprinklers or drip emitters) encounter actually the same drawbacks that were encountered by the farmers, as described above.

SUMMARY OF THE INVENTION

The present invention achieves the advantages of ease in field installation by offering a system amenable to be mechanized, efficient and cheap—those properties of a relatively low costs system, in the manner these advantages are materialized in the low volume irrigation method through an integral drip line, together with the advantages achieved by the other method—the mini sprinkler system—namely wetting large areas on the upper ground surface and generation of a relatively wide, continuing wetting area, as these advantages materialized in low volume irrigation using sprinklers array, as we explained in detail above.

The invention is not restricted to solely the field of agricultural irrigation, but rather it obtains the same advantages in other applications such as for example flushing and rinsing minerals, and by its accord it is not restricted to irrigation by a fluid that is water—but is also applicable for irrigating, wetting or flushing using other liquids, (for example, detergents, water mixed up with fertilizer material and the like).

In one aspect of the present invention, the current invention constitutes an in-line system of mini sprinklers that comprises a tubular conduit endowed with inner and outer surface areas, fitted for a liquid flow under pressure through it and formed with at least one opening along its length. At least one mini sprinkler unit is embedded within the tubular conduit, coupled to the flow of a liquid within it and mounted to it around the opening. The sprinkler unit comprises a liquid distributing assembly that is mobile through the opening, so that when liquid's pressure in the tubular conduit increases, the liquid distributor moves and protrudes beyond the outer surface area of the tubular conduit in order to sprinkle the liquid outwards of the tubular conduit.

Any professional experienced in this field would understand that a major characteristic of the present invention is that the embedding of the mini sprinkler at least substantially in the tubular conduit exists when the system is at its closed (shut down) state. In other words, when the system is at its closed (shut down) state, the mini sprinkler does not protrude more than a few millimeters from the outer surface area of the tubular conduit, and in the preferred embodiment of the invention—it does not protrude at all.

In an additional preferred embodiment of the present invention, several units of mini sprinklers are embedded within the tubular conduit and located along its length with selected gaps between one and each other, and installed, each of them, around an opening.

In yet another preferred embodiment, the mounting of the mini sprinklers unto the inner surface of the tubular conduit is done by heat soldering (while exploiting the heat energy accumulated at the wall of the tubular conduit in the course of its manufacturing).

In an additional preferred embodiment of the invention, the system includes also means for preventing contamination entities from entering into the sprinkler unit. This is formed at the end of the liquid distributor assembly. Moreover, in another preferred embodiment, the means include a sector that was cut off the wall of the tubular conduit by a thin circumferential groove and remains soldered to the upper end of the liquid distributor assembly.

In an additional preferred embodiment, the system includes also means for mounting the tubular conduit in a manner so that the opening from which the liquid distributor assembly protrudes when the liquid pressure increases inside the tubular conduit would be directed upwards.

By another and additional aspect, the current invention comprises a mini sprinkler unit that is includeable, at least substantially, within and fixed into a tubular conduit that is fitted for flow of liquid under pressure inside it. The sprinkler unit comprises a body assembly formed with a surface area sector fitted for mounting to a tubular conduit, an inner volume around which the surface area is formed, and a liquid inlet coupled to it. The structure of the sprinkler includes also a liquid distributor assembly installed within the inner volume of the body assembly, and is mobile relative to the body assembly when the liquid pressure increases in the tubular conduit. Thus when liquid's pressure in the tubular conduit increases, the liquid distributor moves and protrudes beyond the outer surface area sector that are fitted to be mounted on the tubular conduit, and its movement connects the assembly to flow of fluid into it through the liquid inlet of the body assembly.

In a preferred embodiment of the sprinkler, the sprinkler comprises a suction preventing and no drain valve means, that is activated when the pressure drops in the tubular conduit.

In an additional and different aspect, the present invention embodies a method for low volume irrigation that includes the steps of deploying an in-line system of mini sprinklers, composed of a tubular conduit having inner and outer surface areas, adapted to enable flow of liquid under pressure in it and formed with openings along its length, and of several mini sprinkler units that are at least substantially embedded within the tubular conduit while they are located with certain gaps one from each other, coupled to a flow of liquid within the tubular conduit and mounted on it, each of them around one of the openings, and include each one of them, a mobile liquid distributor assembly. Thus when the liquid pressure increases within the tubular conduit, the liquid distributor assembly moves and protrudes towards beyond the outer surface areas of the tubular. An additional step of the method is the feeding of the tubular conduit with liquid under pressure in a way that the mobile liquid distributor assembly will move and protrudes towards beyond the outer surface areas of the tubular conduit and spread the liquid unto the outside of the tubular conduit.

In an additional and different aspect of the present invention, the manner of manufacturing an in-line system of mini sprinklers in accordance with the present invention, embodies a manufacturing method that includes the steps of—continuous manufacturing of a tubular conduit having inner and outer surface areas, adapted to enable flow of liquid under pressure in it, timed feeding and mounting of at least one mini sprinkler unit to the tubular conduit during the process of its continuous manufacturing in a manner that the sprinkler unit would be at least substantially included within in it, and wherein the sprinkler unit includes a body assembly and a liquid distributor assembly that is mobile when liquid pressure increases within the tubular conduit, locating positions of the mini sprinkler units inside the tubular conduit, and forming an opening at the wall of the tubular conduit in a manner that would enable mobility of the liquid distributor assembly through it when liquid pressure increases inside the tubular conduit, so that the liquid distributor assembly would move and protrudes beyond the outer surface area of the tubular conduit.

In another and additional aspect of the present invention, manufacturing an in-line system of mini sprinklers in accordance with the present invention is executed in a system made for continuous manufacturing of a tubular conduit with outer and inner surface area, that is fitted for flow of liquid under pressure inside it (for example, a system for continuous manufacturing of the tubular conduit by extruding tubular profile or a system for manufacturing a sheet and connecting it flush with another sheet along their edges by making two seams, or a system for manufacturing a sheet and folding it into a tube with one lengthwise seam). Wherein the system is characterized by that it includes, in addition, a device for timed feeding and mounting at least one mini sprinkler unit to the tubular conduit, during the process of its continuous manufacturing, in a manner such that the sprinkler unit would be substantially included within in it, and wherein the sprinkler unit includes a body assembly and a liquid distributor assembly that is mobile when liquid pressure increases within the tubular conduit and the system includes in addition, a device for locating positions of the mini sprinkler units inside the tubular conduit and a device for forming an opening at the wall of the tubular conduit in a manner that it would enable mobility of the liquid distributor assembly through it when liquid pressure increases inside the tubular conduit, so that the liquid distributor assembly would move and protrudes beyond the outer surface area of the said tubular conduit.

In yet another preferred embodiment, the device for forming an openings at the tubular conduit's wall executes a thin circumferential groove in the wall of the tubular conduit, that bounds a sector which is disconnected from the tubular conduit's wall but remains secured to an upper (top) surface formed at the end of the liquid distributor assembly.

BRIEF DESCRIPTION OF THE FIGURES

The present invention will be understood and appreciated more fully from the following detailed description, taken in conjunction with the figures, in which:

FIGS. 4a, 4b, 4c and 4d show cross section views of an in-line system of mini sprinklers in accordance with the present invention, in which the mini sprinkler unit illustrated in FIG. 3 is installed. FIGS. 4a to 4d, illustrate:

FIG. 4a—the sprinkler, already at the time the tube is being manufactured, is installed on the inner surface area of the tubular conduit; and FIG. 4b—the system at its close state, wherein an opening was formed on the wall of the tubular conduit as a thin circumferential groove around the upper surface area of the liquid distributor assembly at the time the tube is being manufactured; and FIG. 4c—the sprinkler at its working stage—while the liquid pressure increases in the tubular conduit, the liquid distributor assembly moves through the opening and protrudes beyond the outer surface area of the tubular conduit; and FIG. 4d—concurrently with the drop of the pressure in the tubular conduit, the biasing means force the liquid distributor assembly towards the body assembly of the sprinkler, propels the liquid distributor assembly to return and re-enter into the inside (volume) of the sprinkler's body assembly, wherein simultaneously a circumferential edge formed around the liquid passage flow rate fixer formed in the liquid distributor assembly, moves towards a sealing means that is located at the bottom of the sprinkler's body assembly, for activating the suction preventing and no drain valve means.

DETAILED DESCRIPTION OF PREFERRED EMBODIMENTS

For the sake of convenience, the description of the present invention is presented in terms of agricultural irrigation. As already pointed out, the invention is not restricted solely for tasks of agricultural irrigation, neither is it restricted just to irrigation with water as the only liquid that may be used. On the contrary—the invention is applicable to irrigation, wetting and flushing (rinsing) using other liquids, such as detergents or water in a solution with fertilizing materials and so on.

Referring to figures numbered 2a, 2b and 2c. These figures constitute illustrations (partly in cross sections) of an example of a system 210 for low volume irrigation example in accordance with the present invention.

Figure 2A:
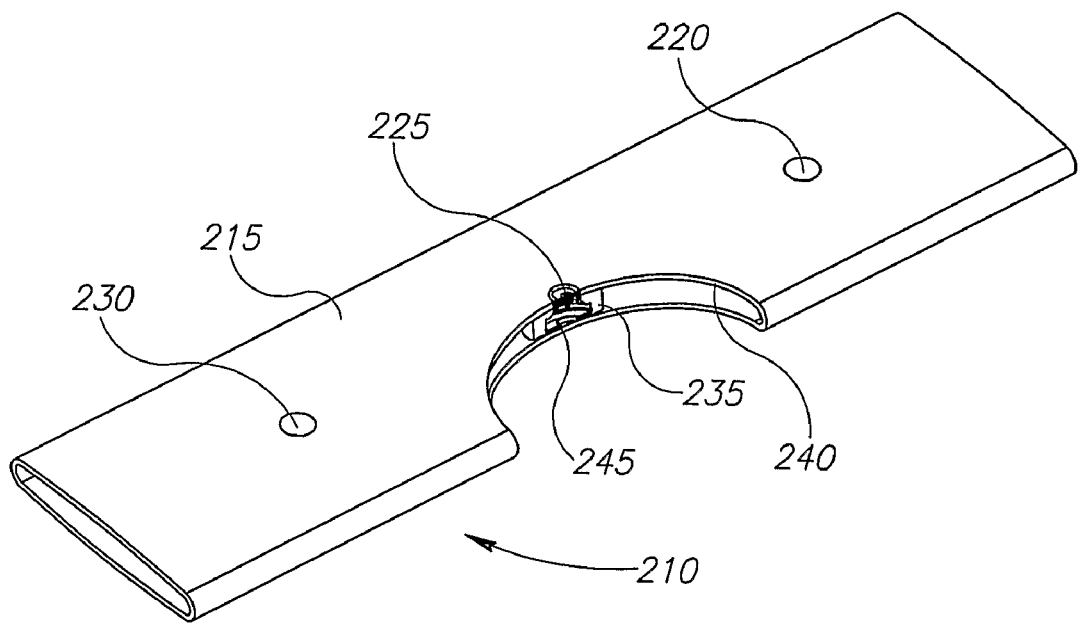
FIGS. 2a, 2b and 2c constitute illustrations (partly in cross section) of an example of a system for low volume irrigation in accordance with the present invention, describing (a) an in-line system of mini sprinklers in its closed state (before driving the liquid into the system), (b) same system after being filled up with liquid and (c) the system in operation state, respectively.

In FIG. 2a, a typical sector of an in-line system of mini sprinklers 210 is presented at its closed state, before driving/forcing liquid to flow into the system. System 210 comprises a tubular conduit 215, fitted to conduct a flow of liquid under pressure in it and formed in the illustrated sector with three openings 220, 225 and 230 along its length. A cross section of mini sprinkler unit 235 is shown in the illustrated sector, contained within tubular conduit 215, secured to its inner surfaces area 240 around opening 225. Additional mini sprinkler units (not illustrated) are mounted, each one respectively, around each of the other openings. Each of these mini sprinkler units includes a liquid distributor assembly 245 as in sprinkler 235 shown in the figure.

Figure 2B:
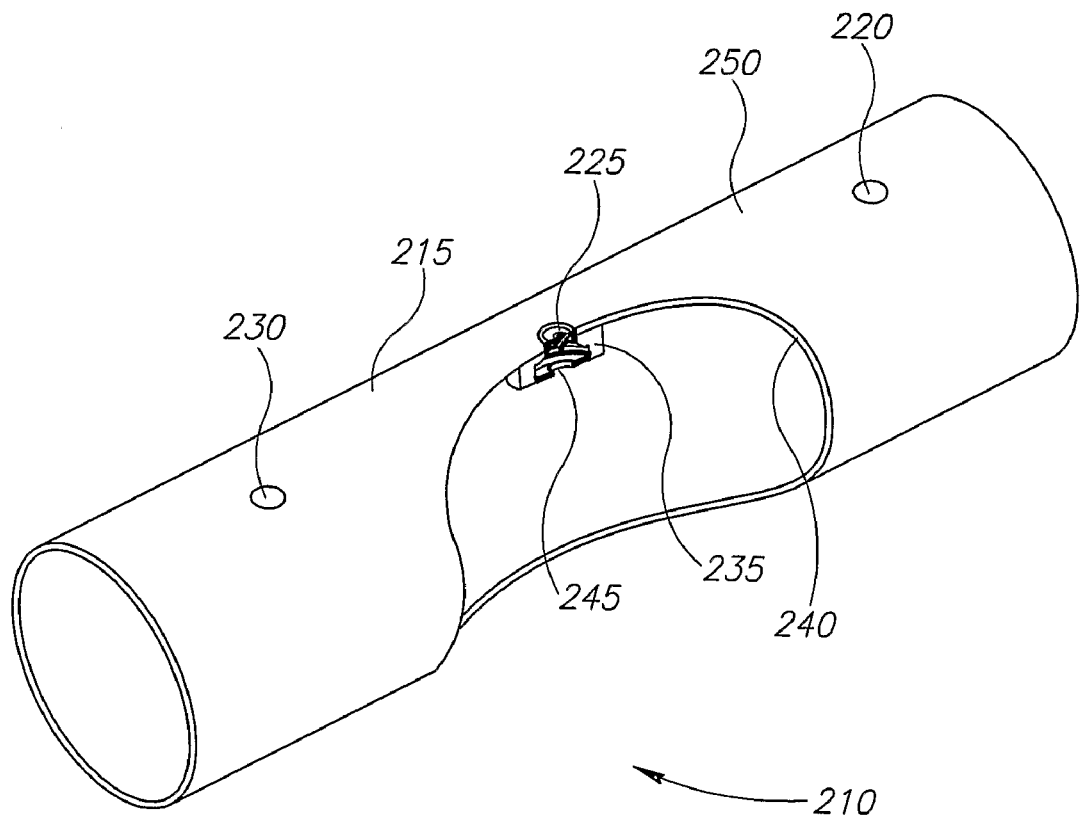

FIG. 2b depicts the same system 210 after tubular conduit 215 was filled up with liquid. The profile of tubular conduit 215 was changed accordingly due to the liquid arrival—from a flat profile (see FIG. 2a) to an inflated tubular profile filled with liquid (see FIG. 2b). The liquid distributor assembly 245 is mobile trough opening 225 in a manner that concurrently with an additional increase of the liquid's pressure within tubular conduit 215 the liquid distributor assembly 245 would move and protrude outwards of the outer surface area 250 of the tubular conduit 215 (in a manner to be explained later while referring to FIGS. 4a to 4d).

Figure 2C:
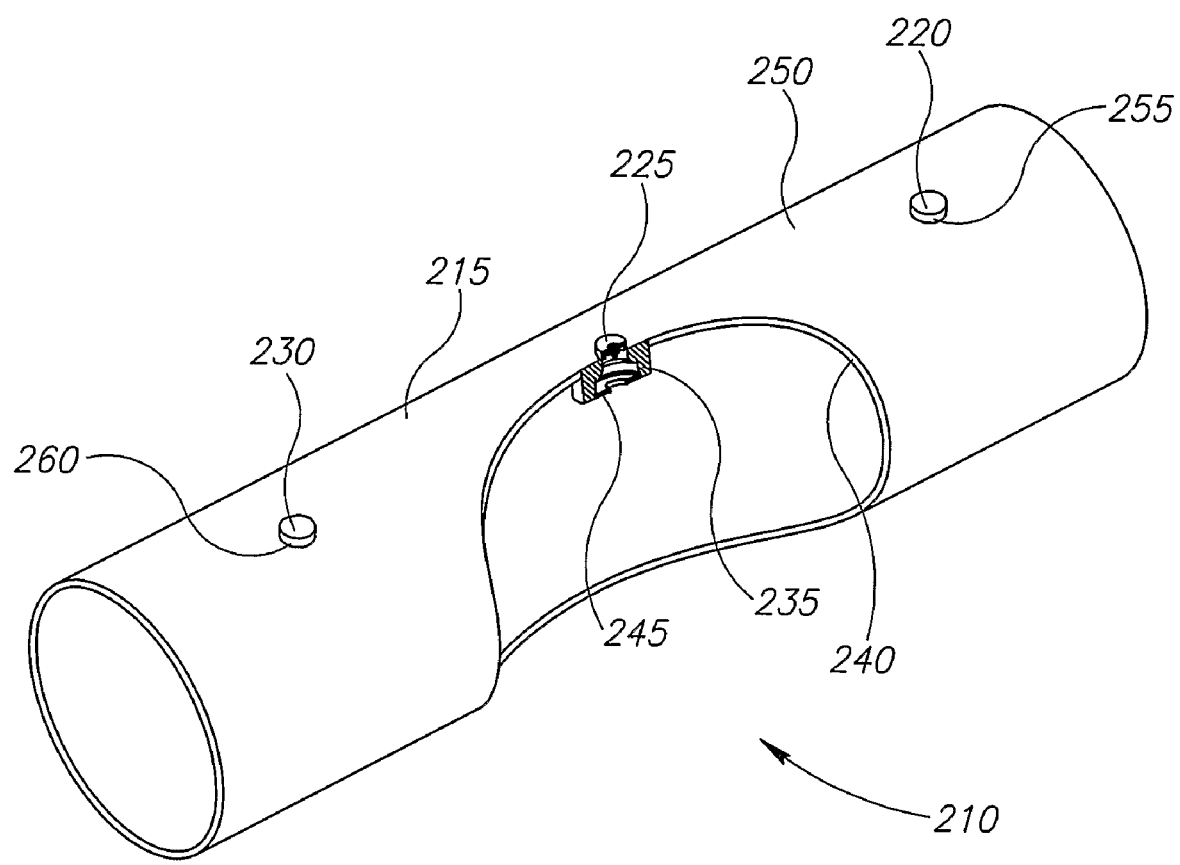

In FIG. 2c system 210 is seen at its operating state—performing low volume irrigation through sprinklers 220, 225 and 230. A further increase of the liquid pressure within tubular conduit 215 brought around, as said, motion of the liquid distributor assemblies 245, 255 and 260 through openings 220, 225 and 230, so that they would protrude outwards of the outer surfaces area 250 of the tubular conduit 215. Each of the liquid distributor assemblies of the sprinklers is now fed by liquid from the tubular conduit 215 and sprinkles it to the surface area around it (in a manner to be explained later while referring to FIGS. 4a to 4d).

Figure 1A:
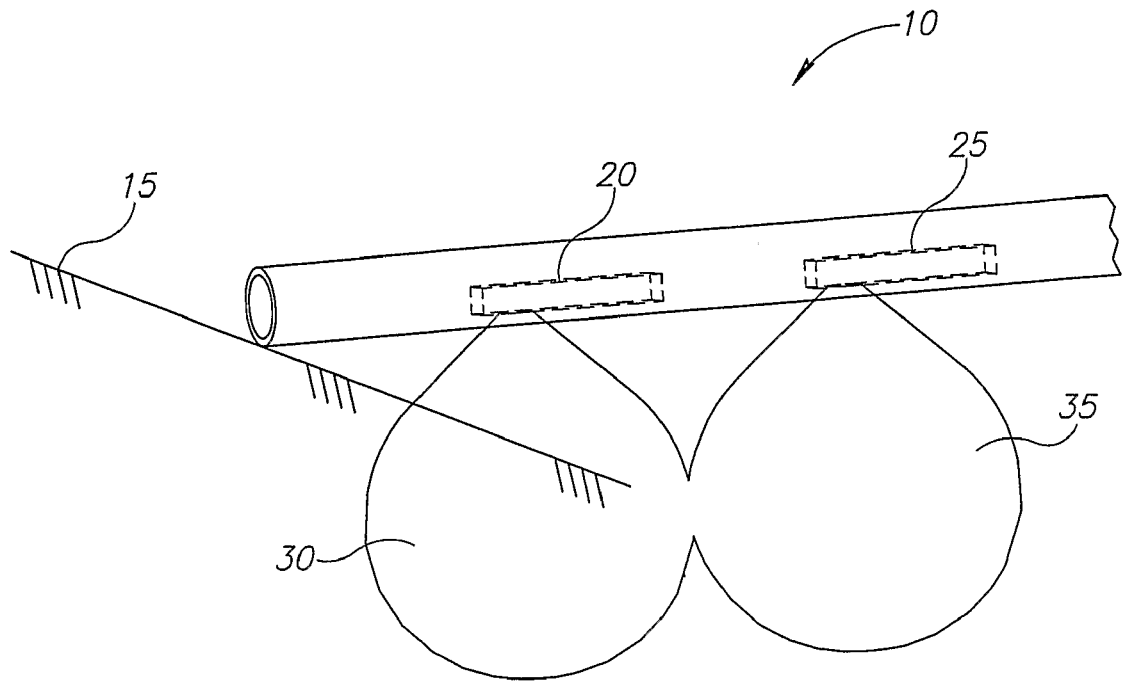
FIGS. 1a and 1b constitute illustrations of prior art referring to low volume irrigation by the integral drip line method and by the sprinklers method, respectively.
Figure 1B:
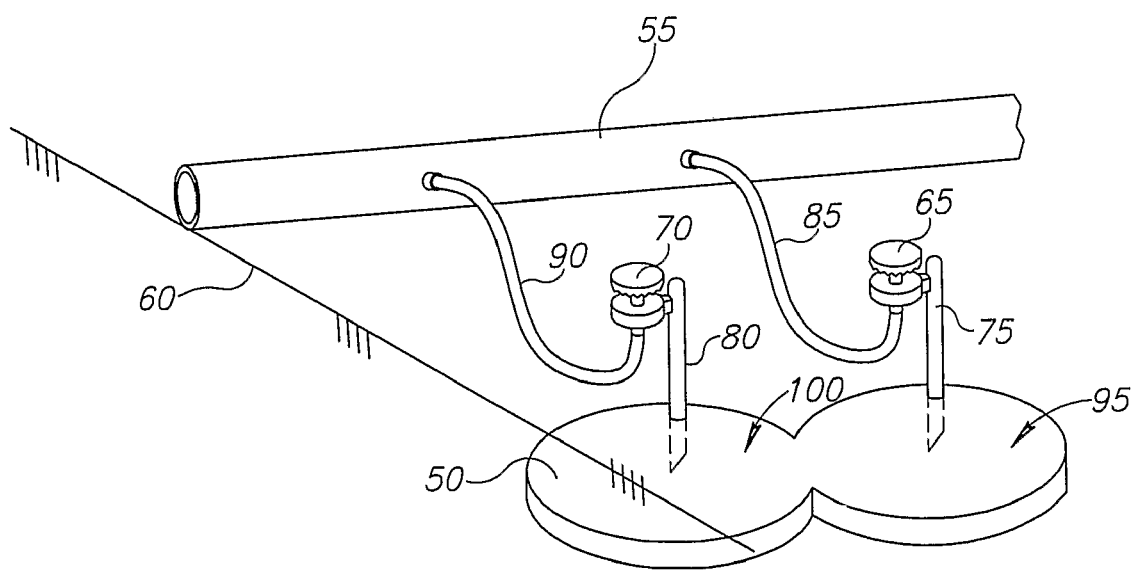

Already at this stage, if we compare the performance attributes of system 210 in accordance with the present invention, as they are illustrated in FIG. 2c to the illustrated prior art (FIGS. 1a and 1b) that as cited, depict the current existing low volume irrigating methods, either using an integral drip line (see FIG. 1a) or by a system of sprinklers (see FIG. 1b), than the impressive advantages of the current invention can be appreciated.

System 210 as per the present invention achieves the advantages of efficient installation in the field of a relatively low priced system, same as these advantages are embodied in the low volume irrigating method using an integral drip line. The tubular conduit 215 contains in it the sprinklers units and thus practically constitutes an integral sprinklers line. As an integral sprinklers line, system 210 is easy to operate in the field. The integral sprinklers line 210 is given to quick deployment and to fast retrieval and rolling with relative ease. The structure of the system also protects the sprinklers from physical impact (harm) as they are embedded within the tubular conduit and not sticking out from it. Any professional experienced in this field would understand that with suitable mechanization, deploying system 210 can be performed swiftly and efficiently and the farmer has only to connect tubular conduit 215 to a water source on its one end and to close its other end (or, in another application, for example flushing (rinsing) minerals, the mine laborer would act the same: connect the tubular conduit 215 to the source of the rinsing liquid—and not forget to close the other end).

Any professional experienced in this field would understand that in order to obtain the advantage we were describing above, a major characteristic of the invention is the embedding of the sprinkler within the tubular conduit, that actually occur when the mini sprinkler is at least substantially embedded in the tubular conduit when it is in its closed state. In system 210 the sprinklers are totally "buried" within the tubular conduit, namely—when the system is in its closed state, they do not protrude beyond the outer surface area of the tubular conduit. At the same time, even if the sprinkler would protrude slightly from the outer surface of the tubular conduit (for example up to 4 mm), this presented advantage of the system in accordance with the invention would prevail.

Similarly, system 210—in accordance with the invention, achieves the sought for advantages of wetting the upper layer of the ground and the generation of a relatively wide and continuing area, as these advantages are embodied in low volume irrigation by an array of sprinklers. In agricultural irrigation applications, system 210 wets, simultaneously, a relatively large area of the ground upper layer, and thus exploits in an optimal manner the ground upper layer for development of roots. On the ground surface (marked in FIG. 2c by line 265), the area of wetting that would be received from irrigating by a system such as system 210, constitutes an array of relatively large wetted areas, that together form one relatively large wetted area 270. System 210 produces a wide and continuing wetting band that would enable as said, the development of a wide upper roots system in the upper layer of the ground (that is, as explained, the more fertile and well aired layer). Thus system 210 enables optimal (and maximal) use of the water and the fertilizer by the roots, together with performing more efficient rinsing and driving away salts that accumulate in the ground surface (especially in dray air areas). It can be said that it creates a micro change of the climate, namely reducing the temperature and increasing the humidity, generating a growth environment that "hides"—by driving into the ground (a beneficial result) the fertilizers spread on the ground.

Thus, in the operation mode of system 210, a general method for low volume irrigation is embodied (and as said, this kind of irrigation is not restricted to agricultural applications exclusively, but rather it can serve other chores of such as rinsing minerals or wetting surfaces). The subject is the availability of a general method that might be materialized in other systems that would be assembled in accordance with the invention.

A method that includes the steps of deploying an in-line system of mini sprinklers that is made if a tubular conduit having inner and outer surfaces, fitted for flow of liquid under pressure in it and formed with openings along its length, and several mini sprinkler units that are embedded within the tubular conduit wherein they are located along its length at given gaps between them, and mounted, each of them, around one of the openings. The sprinkler units comprises, each one of them, a liquid distributor assembly that is mobile in a manner that when the liquid pressure inside the tubular conduit increases, the liquid distributor moves and protrudes beyond the outer surface of the tubular conduit. In the second steps driving liquid under pressure occurs within the system's tubular conduit in a manner that the liquid distributors would move and protrude beyond the outer surface area of the tubular conduit and subsequently spread liquid outwards from the tubular conduit.

Any experienced professional would understand that in order to ensure the continuing wetted path 270 as n FIG. 2c, it is required to position the tubular conduit 215 relative to the ground top surface so that openings 220, 225 and 230, through whom the liquid distributing assemblies move and protrude outwards, so that they will be directed in a direction that is substantially perpendicular to the ground surface 265. In the example illustrated in FIGS. 2a to 2c, this direction is achieved merely by laying the tubular conduit 215 simply flat and empty from liquid on the ground (see FIG. 2a), while strictly ensuring the openings directed upwards, so that even its being filled up with liquid concurrently with the increase of liquid pressure inside it would not topple it. Similarly, any experienced professional would understand that means (not illustrated) may be added to system 210 for anchoring the tubular conduit 215 in a manner that the openings would substantially remain in this upwards directed position—perpendicular to the ground. For example pegs ("peg means") might be driven into the ground along tubular conduit 215 and anchor it to the pegs in the correct orientation, independent of the exact anchoring mode—whether the tubular conduit 215 is laid on the ground or hanged correctly above it, or hanging a wire means unto which the tubular conduit 215 would be hanged (in the latter case, of the tubular conduit being hanged up in the air, it is also possible to direct the opening downwards toward the ground).

Figure 3:
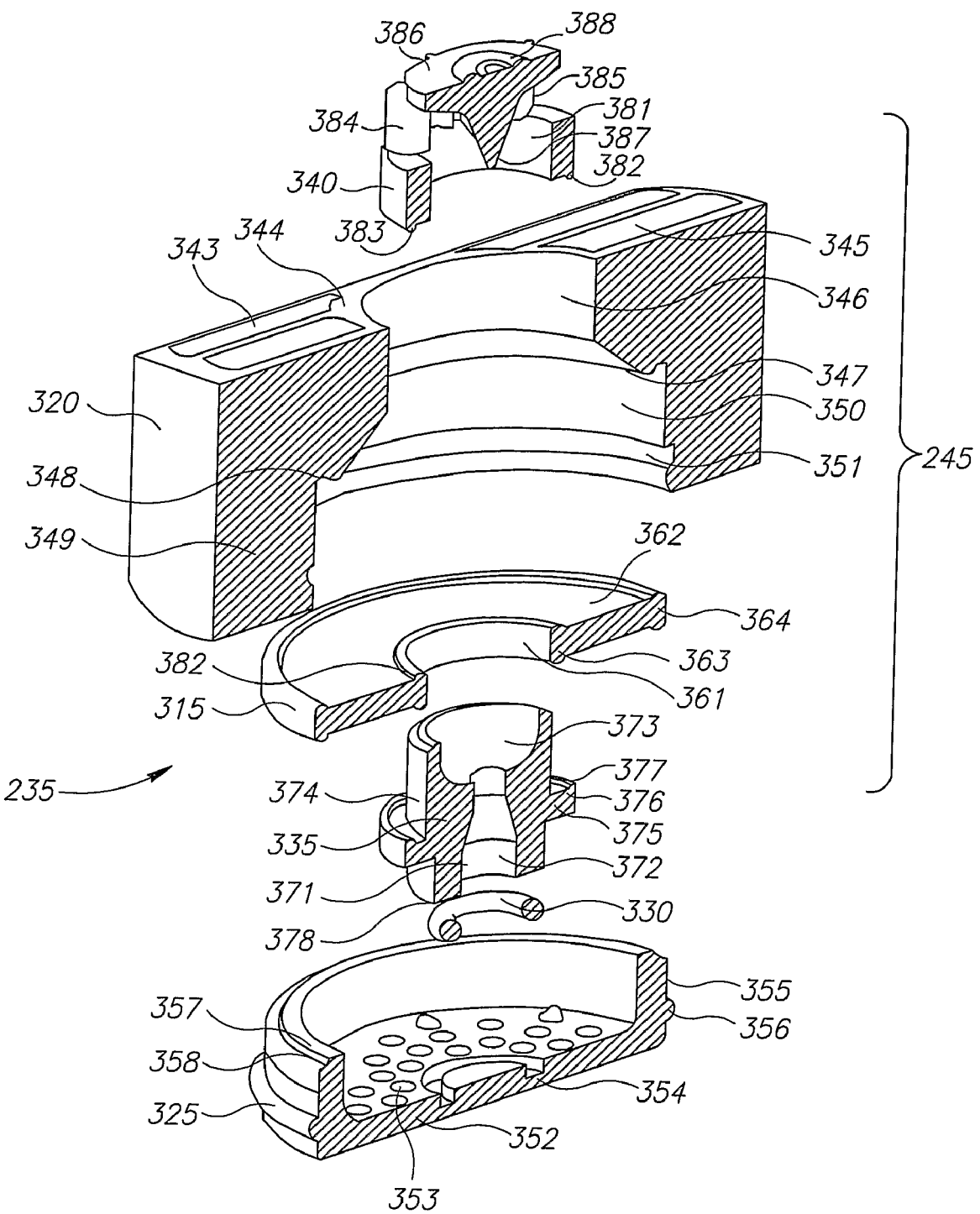
FIG. 3 represents an exploded view (in cross section) of sample components of a mini sprinkler unit that can be mounted unto the inner surfaces of a tubular conduit in accordance with the present invention.

Referring to FIG. 3. FIG. 3 represents an exploded view (in cross section) of sample mini sprinkler unit 235 components that was illustrated in FIGS. 2a to 2c as it is secured to inner surface 240 of tubular conduit 215.

Any professional would understand that the shown structure of sprinkler 235 is presented solely as an example, and that an in-line system of mini sprinklers according to the present invention might include mini sprinklers having a different structure that however, are also amenable to being secured substantially within the tubular conduit, each one of them around an individual opening as cited, wherein they also include a liquid distributor assembly that is mobile through the opening, in a manner that with the increasing liquid's pressure in the tubular conduit the liquid distributor moves and protrudes beyond the outer surface area of the tubular conduit.

A mini sprinkler unit includes, as cited, a mobile liquid distributor assembly 245 and also a body assembly 310 and biasing means 315.

Body assembly 310 comprises three components—body component 320, liquid inlet component 325 and sealing means 330. Sprinkler 235 also includes biasing means 315 and mobile liquid distributor assembly 245 that includes only two components—liquid passage flow rate fixer 335 and distributor component 340.

Any professional would understand that the relatively small number of components) making up mini sprinkler 235 (six in the illustrated example), contribute to lowering the costs involved in manufacturing it and assembling it in the system.

Body component 320 is manufactured by a mold injection process and formed as an elongated part. Voids are formed in body component 320 in order to reduce its weight and save on raw materials (one such void, for example, is designated 343). Body component 320 is formed with a surface area sector 344 at its upper part. Surface area sector 344 as far as their geometric outline is concerned are suited for installation on the inner surface of the tubular conduit (an arch like outline in its shape with cross section dimensions that match the expected outline of the cross section of the inner surface of the tubular conduit, when it is filled up with liquid). Surfaces areas 344 are formed around an inner volume 345 formed in the body along its entire length. Inner volume 345 is formed from opening 346 that enables the movement of liquid distributor assembly 245 through it (in a manner that would be explained later on while referring to FIGS. 4a, 4b. 4c and 4d), from a conical bracket 347 linked to opening 346, from circumferential channel 348 with protruding edges 349 that is formed at bottom of a conical bracket 347, and from wall 350 that is linked to circumferential channel 348 and formed at its bottom part with circumferential groove 351 that is fitted to serve as a bracket in an undercut type of connector with liquid inlet component 325.

Liquid inlet component 325 is also manufacture by injection and formed as a quasi "glass" with a flat bottom 352. Liquid inlet component 325 is made to fit installation inside the inner volume 345 of body component 320. Flat bottom 352 of liquid inlet 325 is formed with a plurality of through holes 353 that, as we will see later on, serve as a liquid straining filter. A ring like groove 354 formed at the center of a flat bottom 352 and with it dimensions fitted to enable the anchoring of sealing means 330 in it. The circumferential wall 355 of liquid inlet 325 is fitted for being installed within internal volume 345 of body component 320 while being as well in contact with wall 350. On the circumference of liquid inlet 325, a circumferential bulge 355 is formed that upon installation is adapted to enter into groove 351 (so that, as cited, it generates an undercut type of connector with body component 320). The upper surface area 357 of circumferential wall 355 is formed with an external step 358 around their circumference.

Sealing means 330 is, in the illustrated sprinkler example, an elastomer seal in a configuration of an o-ring that is fitted in its dimensions, as cited, to be installed within the ring like groove 354.

Biasing means 315 is—in the illustrated sprinkler example, an elastomer ring component. Elastomer ring 315 is formed with opening 361. The surface area 362 of elastomer ring 315 are formed at their ends, on both sides—top and bottom, with circumferential bulges 363 (on the circumference of the ring's inner part), and—364 (on the circumference of the ring's outer part). Bulges, that as we will see later (would be explained later when referring to FIGS. 4a to 4d), serve for anchoring biasing means 315 at its outer part to the circumference of the inner volume 345 of body assembly 310, and at its inner part, to the outer circumference of the mobile liquid distributor assembly 245.

Liquid passage flow rate fixing component 335 is formed by injection in a quasi "piston" configuration that has a central passage 371 along its total length. Central passage 371 is formed with liquid entrance 372 and liquid exit 373. Liquid entrance 372 is formed with a "lip" 378 around its circumference in a manner that enables sealing contact between it and sealing means 330. Liquid exit 373 is formed with a circumferential wall 374 that is adapted to installation by pressure within distributor component 340. Around the external circumference of component 335 a circumferential bulge 375 is formed endowed with protruding edges 375 on its one side. As we will see below, when referring to FIGS. 4a, 4b, 4c and 4d, a circumferential channel 377 that is formed between the bulging edges 376 to the component body, serves for anchoring the inner part of the biasing means 315 to the mobile liquid distributor assembly 245.

Distributor component 340 is also manufactured by injection molding in quasi "piston" configuration with a central passage 381 that is adapted by his dimensions to include within it by pressured installation the circumferential wall 374 of liquid passage flow rate fixer component 335. Around the bottom of distributor component 340, a circumferential bracket 382 is formed with edges 383. As we shall see below, when referring to FIGS. 4a to 4d, circumferential bracket 382 also serves for anchoring the inner part of biasing means 315 to the mobile liquid distributor 245. At its upper part, the distributor component 340 is formed with a number of ribs 384 around its circumference. Passages 385 that are hence formed, between ribs 384, serve for the liquid's passage and distribution. At the upper end of distributor component 340, on the ribs 384 and as an integral part of the liquid distributor component 340, an upper plane 386 is formed. On its inner side that faces towards central passage 381, that upper plane 386 is formed as a stepped cone 387. Stepped cone 387 serves to direct the liquid flow towards passages 385. On its outer side an upper plane 386 is formed at its center with a protruding ring 388.

Referring to the FIGS. 4a, 4b, 4c and 4d. The FIGS. 4a, 4b, 4c and 4d show cross section views of example of an in-line system of mini sprinklers 410 in accordance with the present invention. In-line system of mini sprinklers 410 comprises a tubular conduit 411. Unto its inner surface area 412, a mini sprinkler unit 235 is secured. The parts of components of mini sprinkler 235 are illustrated in FIG. 3.

As cited, any professional in this field would understand that to the same extent and in accordance with the invention, mounting the mini sprinkler unit might be done either to the wall of the tubular conduit or to its outer surface area, or even combined, but in any case it is mandatory that in the closed state of the system, the mini sprinkler unit would be at least substantially included within the tubular conduit and not protrude too much from the outer surface area of the tubular conduit (for example—not more than 4 mm), so that a the system in accordance with the invention would really be an in-line system of mini sprinklers.

System 410 is illustrated in FIGS. 4a, 4b, 4c and 4d, as it is seen at the different stages of the process of its manufacturing and its operation. System 410 is characterized by in its production, sprinkler 235 is mounted to the internal surface 411 while already completely assembled.

Tubular conduit 411 in FIGS. 4a, 4b, 4c and 4d, is only partly illustrated. Any professional in this field would understand (and we will continue to elaborate on this subject when referring to FIGS. 5a, 5b, 6, 7a, 7b, and 8), that in a system in accordance with the invention, and hence in system 410, the tubular conduit might be formed by continuous extrusion of a tubular profile, or from two sheets that are coupled flush one to the other at the edges or also as a tube made of a folded sheet.

Figure 4A:
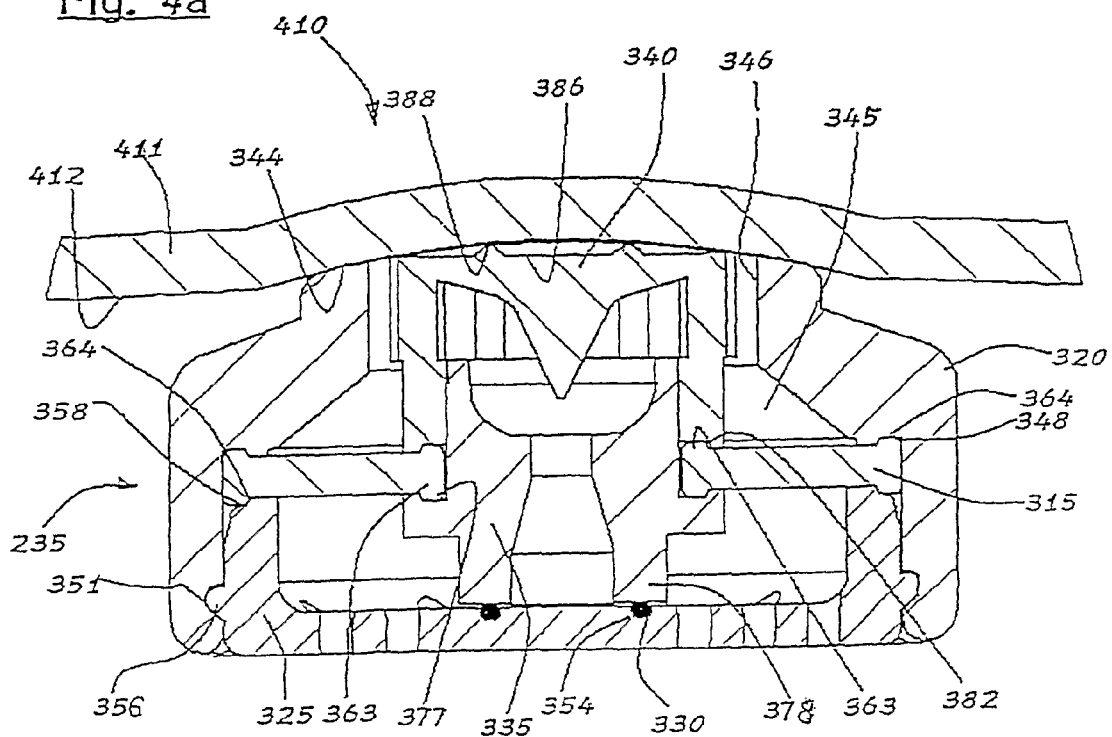

FIG. 4a shows a cross section view of sprinkler 235 immediately after it was secured to the inner surface area 412 of tubular conduit 411. It has to be remembered that at this stage, the manufacturing process of system 410 in accordance with the invention was not yet completed because the opening in the tubular conduit, that enables the movement of the liquid distributor assembly of the sprinkler through it, was not yet formed.

As cited, system 410 is characterized in that the sprinkler units installed in it are secured to the inner surface area of the tubular conduit after they were assembled, each of them, at an earlier stage. Thus, in the example illustrated in the figure, mini sprinkler unit 235 has been already assembled at an early stage—

Elastomer ring 315 was inserted into the inner volume of 345 of body component 320 through its bottom part. Outer upper circumferential bulge 364 of elastomer ring 315 was positioned in circumferential groove 348 of body component 320. Liquid passage flow rate fixer 335 was also inserted into inner volume 345 of body component 320 from its bottom part direction. Inner lower 377 of circumferential bulge 363 of elastomer ring 315 was positioned in circumferential groove of liquid passage flow rate fixer 335. Elastomer seal 330 was positioned inside ring like groove 354 that is in liquid inlet component 325. At this stage, liquid inlet component 325 was inserted into internal volume 345 of body component 320 from its bottom part direction. An undercut type connector was formed between liquid inlet component 325 to body component 320, as a result of circumferential bulge 335 becoming interlaced with groove 351. In this state lower outer circumferential bulge 364 of elastomer ring 315 was positioned inside step 358 of liquid inlet component 325. By this manner, elastomer ring 315 was anchored at its outer circumference to the inner volume circumference 345 of body assembly 310. At this stage, distributor component 340 was inserted through opening 346 of body component 340. Distributor component 340 was installed by pressure on liquid passage flow rate fixer 335. At this state, upper inner circumferential bulge 363 of elastomer ring 325 was positioned within circumferential bracket 382 of distributor component 340. By this manner, elastomer ring 315 was anchored at its inner circumference unto the outer circumference of liquid distributor assembly 245.

Attention should be given to the fact that at this stage circumferential edge 378 of liquid passage flow rate fixer 335 is biased through elastomer ring 315 into a sealing contact with elastomer seal 330 located at the liquid inlet component 325.

At this stage, the task of assembling sprinkler 235 was terminated, and it is, now that it is assembled, ready for being secured unto the inner surface area 412 of tubular conduit 411.

Any professional would understand (and we will continue to elaborate on this subject when referring to FIGS. 5a, 5b, 6, 7a, 7b, and 8) that securing sprinkler unit 235 unto the inner surface area 412 of tubular conduit 411, might be executed by heat soldering, (while exploiting the heat energy accumulated at the wall of the tubular conduit in the course of its manufacturing). In case it is desired to utilize the heat soldering possibility, any experienced professional would understand that at least the surface area sector 344 has to be manufactured from a material that is solderable by heat to material from which the tubular conduits are manufactured in the irrigation industry (for example, polyethylene). Among the additional possibilities for securing a mini sprinkler to the inner surface area of the tubular conduit are securing by heat soldering as described above but with the addition local heating, or using adhesives and thinners.

Sprinkler 235 is secured to inner surface 412 (for example, by heat soldering as explained) in a manner that surface area sector 344 that is formed at the upper part of body component 320, is secured to the inner surface of tubular conduit 411 along the quasi arc outline as cited in which a surface area sector was formed (in accordance with the expected outline of the inner volume of the tubular conduit, when it is filled up with liquid). Any professional would understand that forming body component 320 as an elongated part (see FIG. 3), facilitates aligning and feeding sprinkler 235 in the appropriate orientation for being installed, so that thus the quasi arch outline of surface area sector 344 would achieve accurate contact with the inner surface area 412 of tubular conduit 411.

At the same time, ring 388 formed at the upper part of distributor component 340, is also secured to the inner surface area of tubular conduit 411. Any professional would understand that because the distributor component is non directional in its mounting or in other words, it may be installed on liquid passage flow rate fixer 335 in any desired relative orientation between them, ring 388 that protrudes from upper plane 386, ensures contact with the inner surface of the tubular conduit, and this without having to force the inner surfaces of the tubular conduit to suit themselves to the outline of plane 386. In case it is desired to exploit the heat soldering technique, any professional would understand that at least ring 388 has to be manufactured form a material that is solderable by heat to the materials from which the tubular conduits are manufactured in the irrigation industry (for example, polyethylene).

Figure 4B:
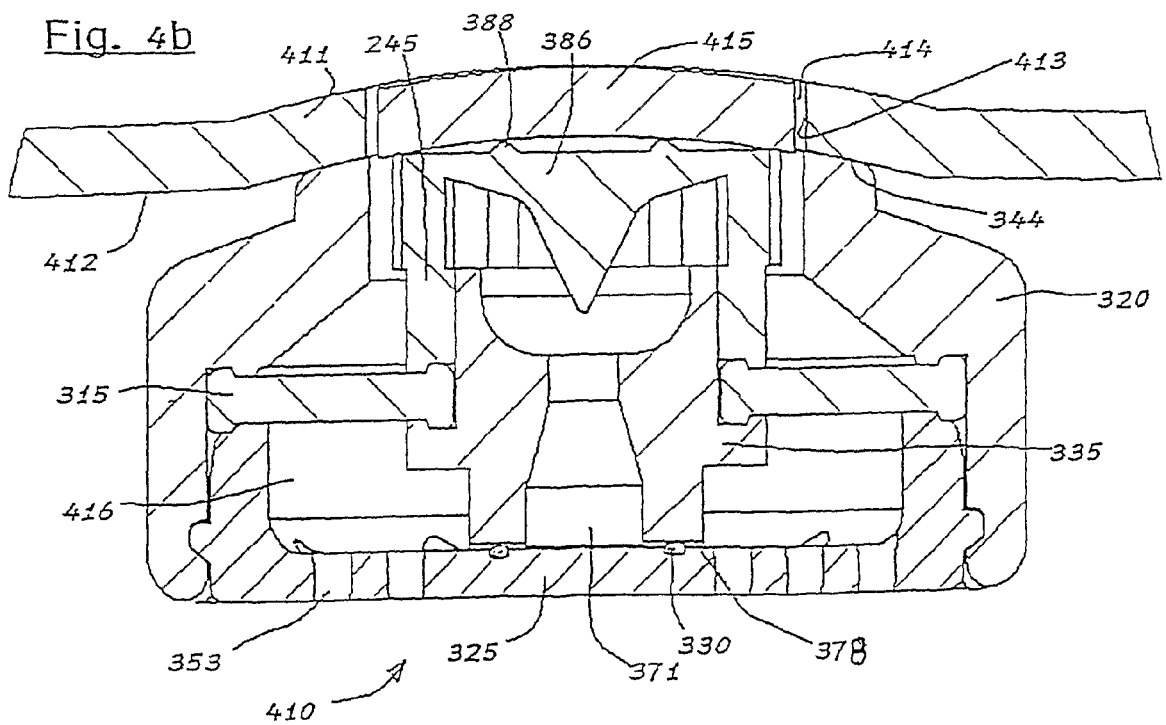

FIG. 4b is a cross section view of system 410 at the stage it is ready for use. System 410 is illustrated at its closed state, wherein an opening 413 was formed already at the manufacturing stage, on the wall of the tubular conduit 411 as a thin circumferential groove 414 around the outer plane 386 of the liquid distributor assembly 245.

Forming opening 413 at this stage, leaves a disconnected sector 415 (from wall of tubular conduit 411), that is secured to the liquid distributor assembly 245 (as a result from heat soldering sprinkler 235 to inner surface 412 of the tubular conduit). A thin circumferential groove 414 bounds the dimensions of the cut-off sector 415. As cited circumferential groove 414 is formed to be, thin at its thickness dimension— for example 0.1 to 0.3 mm.

Any professional would understand that, in the closed state at which system 410 is illustrated (FIG. 4b), a cut off sector 415, as well as the minimal thickness of circumferential groove 414, constitutes a means for preventing penetration of contaminants into sprinkler unit 235. Means for preventing contaminants penetration formed at the end of liquid distributor assembly 245, that concurrent with increasing liquid pressure in tubular conduit 411, would move through opening 413 and protrude beyond the outer surface area of the tubular conduit (and see also more when referring to FIG. 4c).

As cited, system 410 is illustrated at its closed state. In this state, driving liquid to flow into tubular conduit 411 would not necessarily bring about the activation of liquid distributor assembly 245 to move through opening 413. Liquid would pass via through holes 353 that serve as a sifting filter, and enter volume 416 but as long as the pressure would not be higher than a threshold given to be defined, circumferential edge 378 of liquid passage flow rate fixer 335 would continue to be biased by elastomer ring 315 to a sealing contact with elastomer seal 330 located at liquid inlet component 325.

Any professional would understand that we actually refer to a structure of a valve that comprises a suction preventing and no drain valve means. Means for biasing the liquid distributor assembly 245—elastomer disk 315 in the illustrated example, biases the circumferential edge 378 to a sealing contact with a sealing means—namely elastomer seal 330 in the illustrated example, in a manner that prevent inwards suction of external entities at the time of closing or opening of the liquid pressure in the tubular conduit 412 and also prevents passage of liquid from liquid entrance void 416 formed in body assembly 310, to the liquid passage flow rate fixer 371, and this as long as the liquid distributor assembly 245 was not yet activated to move due to liquid pressure increase beyond a threshold that is given to be defined, within tube 412, Any professional would also understand that a sealing contact between liquid passage flow rate fixer 335 to liquid inlet component 325 might also be achieved without resorting to use elastomer seal 330, namely—by biasing the circumferential edge 378 to direct contact with the surface area of the flat bottom of the liquid inlet component 325. Alternatively, the elastomer seal 330 might be positioned even on the surface of circumferential edge 378.

FIG. 4c is a cross section view of system 410 at its working state. With pressure increasing in the tubular conduit 411, liquid distributor assembly moves through opening 413 and protrudes beyond the outer surfaces 417 of tubular conduit 411.

The liquid that underwent filtering via the through holes 353, from tubular conduit 411 to void 416, exerts a pressure on elastomer ring 315. Liquid pressure increase in the tubular conduit increases the pressure generated, as cited, in volume 416. This pressure eventually overwhelm the biasing force of elastomer ring 315 (the biasing force responsible for moving liquid distributor assembly 245 towards liquid inlet component 325 of body assembly 310). Overcoming the biasing force of elastomer ring 315 brings about its stretching while the stretching of the ring results in propelling liquid distributor assembly 245 to move upwards relative to body assembly 310, via opening 413. The pressure in volume 416 stretches elastomer ring 315 until a contact is achieved between it and conic bracket 347 formed in body component 320. At this state, edge 378 moved away from its sealing contact with seal 330 and the flow of the liquid passes to central passage 371 and from there it is directed by a stepped cone 387 to passages 385. From these passages 385 the liquid is sprinkled around the circumference of sprinkler 325, in the direction of the arrows marked 418.

Figure 4D:
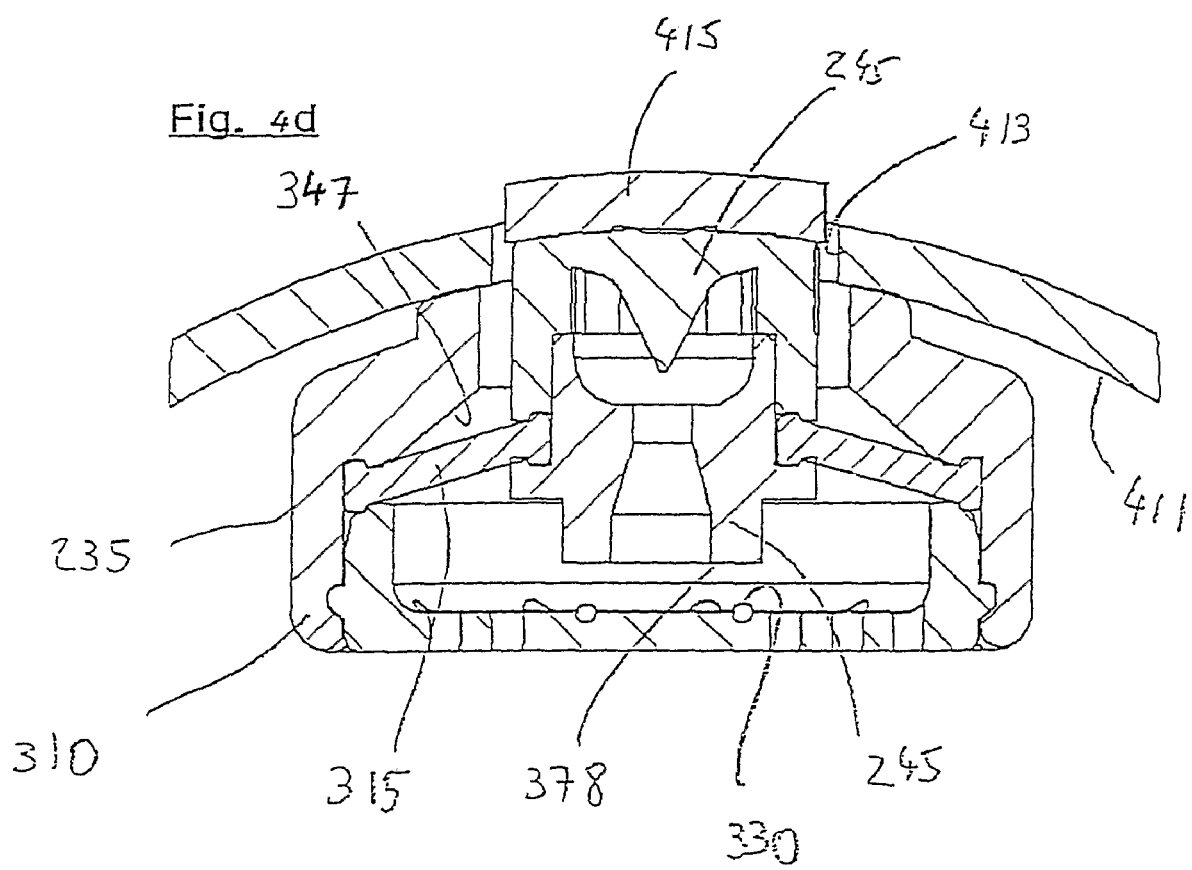

FIG. 4d is a cross section view of system 410 at the time the liquid pressure in tubular conduit 411 starts to drop. In this state of decreasing pressure, the biasing means force liquid distributor assembly 245 to move towards the body assembly of sprinkler 235. In the illustrated example, elastomer ring 315, drives liquid distributor assembly 245 to return and move in the opposite direction—to converge towards body assembly 310 of sprinkler 235. Elastomer ring 315 becomes disconnected from conical bracket 347 and is drives circumferential edge 378 to move towards sealing means 330 for generating a valve preventing suction and no drain valve means. Concurrently, disconnected sector 415 moves and converges into opening 413, forming an efficient means for preventing penetration of contaminant into sprinkler 235.

As we have pointed above, the structure of sprinkler 235 and its operation mode as were described in relation to FIGS. 3 and 4a to 4d, were only an example, and an in-line system of mini sprinklers in accordance with the present invention might include mini sprinklers of very different structure or operation manner. For example, a sprinkler that would be intended for systems according to this invention, but will serve for flushing (rinsing) minerals in mines, might not include at all a suction prevention and no drain valve means. Moreover, the structure of the mini sprinkler 235 itself, might include different components, for example, any experienced professional would understand that the biasing means for forcing the liquid distributor assembly towards the body assembly of the sprinkler might just be a spring means, and not necessarily an elastomer disk as was described up to now.

A prominent advantage of the current invention, is the capability to manufacture an in-line system of mini sprinklers in accordance with the invention, such that plurality of mini sprinklers would be included in the tubular conduit and secured to it at pre designed gaps and distances one from another, and this would be done simultaneously with the actual running production of the tubular conduit, without having to stop the regular production line of the tubular conduit, whether we are talking of a production line by extrusion of a tubular conduit that has a hollow tube profile with no seams or as a tubular profile made up from two sheets that are connected flush one to the other at the edges, resulting in a tube with two seams, or also just formed as a tube from a folded sheet that is eventually made as a tube with one seam along its length.

Figure 5A:
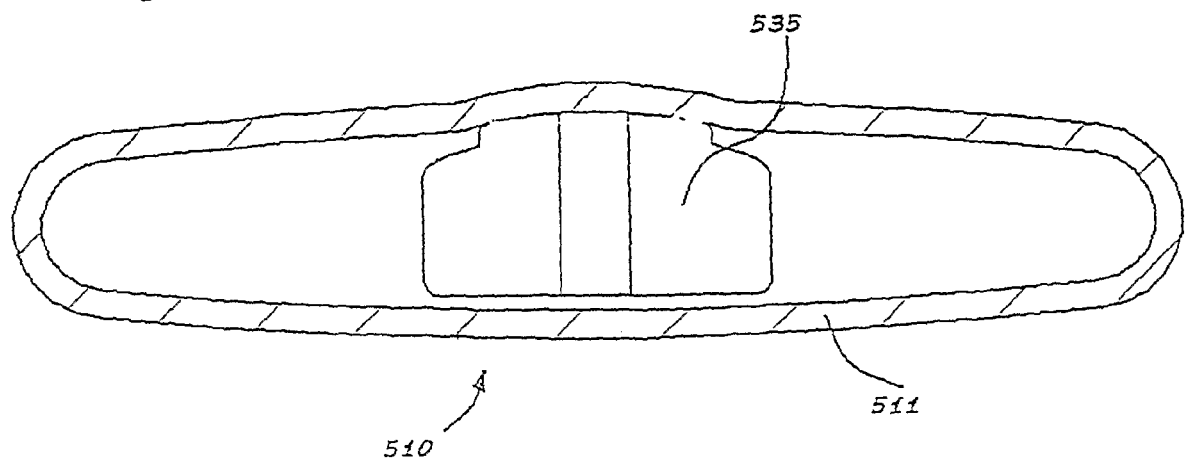
FIGS. 5a and 5b constitute cross section illustrations of an example of an in-line system of mini sprinklers in accordance with the present invention, wherein the tubular conduit was formed by a continuous extrusion process of a tubular profile. The two figures describe the tubular conduit (a) before the liquid is driven to flow in it and (b) at the time the liquid does flow, respectively.
Figure 5B:
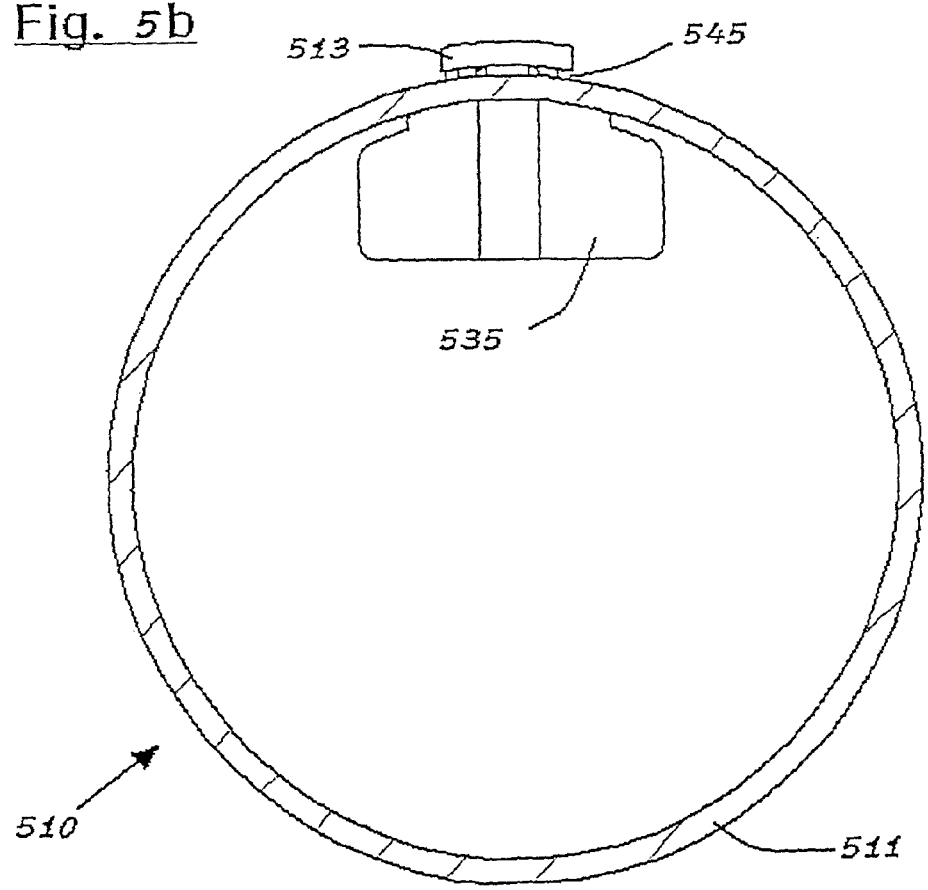

Referring to FIGS. 5a and 5b. The figures show in a cross section view, an example of an in-line system 510 of mini sprinklers 535 in accordance with the present invention, wherein the tubular conduit 511 was formed by a continuous extrusion of a tubular profile. Namely, the tubular conduit was manufactured as a hollow profile requiring no seams. FIG. 5a shows the tubular conduit 511 before the liquid was made to flow into it. In FIG. 5b tubular conduit 511 is shown when tubular conduit 511 is blown up with the liquid inside it, wherein the liquid distributor assembly 545 of sprinkler 535, protrudes through opening 513, beyond tubular conduit 511 outer surface area.

Figure 6:
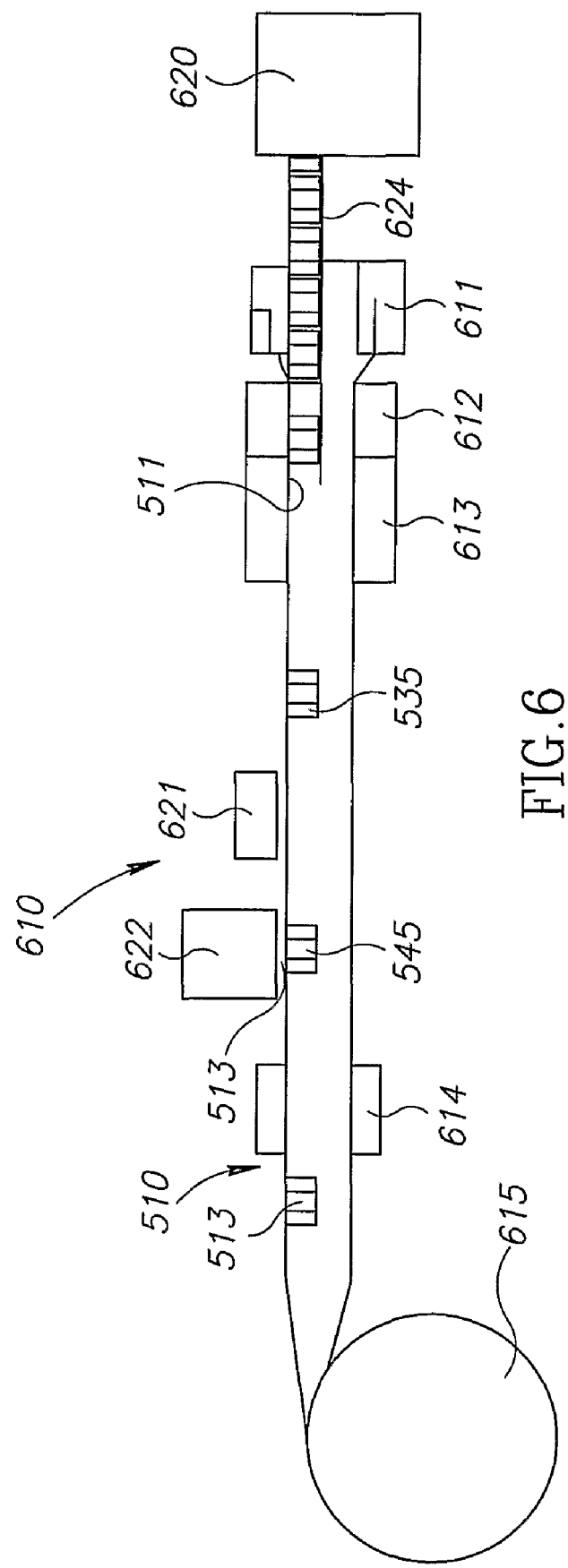
FIG. 6 constitutes a schematic illustration of an example of an array for manufacturing the in-line system of mini sprinklers illustrated in FIG. 5.

Referring to FIG. 6, FIG. 6 constitutes a schematic illustration of an example of an array 610 for manufacturing the in-line system of mini sprinklers 535 illustrated in FIGS. 5a and 5b.

Any professional experienced in the field of extrusion recognizes systems and methods for continuous production of hollow profiles while embedding in them discrete components (for example—drip emitter units if we refer to a production line for manufacturing integral drip line with drip emitters inserted in it along its length). Another example might be the case wherein while in the extrusion process, a single continuous item is embedded in the tube, e.g. an electric cable coated with an extruded continuous polymer envelope.

System 610, hence includes for example, devices that are known and recognized in that field., e.g., a cross head 611, calibration means 612, cooling baths 613, puller 614 and roller 615.

But, as different from the known and recognized production lines, system 610 includes in addition a device 620 for continuous feeding of the mini sprinkler units 535 through the passage in cross head 611 and installing them on the inner surface of the tube being extruded 511. An additional devices are device 621 for locating the mini sprinklers 535 within the extruded tube together with a device 622 for forming openings 513 at the wall of the tubular conduit, in accordance with the indications received from the locator device 621. Openings that would enable the movement of the liquid distributor assembly 545 through the opening as cited, so that the liquid distributor assembly 545 would pass through the opening upon the growing liquid pressure and protrude to beyond the outer surfaces areas of the tubular conduit in accordance with the invention.

Device 620 includes accumulation and feeding means of pre assembled sprinkler units 535, for bringing them through the passage at the extruder cross head 611, at a pre defined accurate timing and at a constant selected orientation, to the contact point with the inner surface area of the tubular conduit (for example, at the location of the calibrator opening or inside it).

Any professional in this field would understand that the cited accumulation and feeding means necessitated using automation and control means (for example—vibrating means that directs the sprinkler units to the correct orientation, a piston or a servo motor for timely feeding the sprinkler units on a track means toward the inner surface of the extruded tube, speed control circuitry linked to the puller located at or near the end of the production line).

Device 621 is located after cooling bath 613. The locator device detects the locations of the sprinklers within tubular conduit 511 and times the operation of device 622 by providing indications regarding the locations of the sprinkler units. Any professional in this field would understand that for locating the sprinkler units, device 621 might activate sensor devices of various kinds, e.g., a wheel connected to a micro switch and sensing the "bulge" created by the sprinkler unit within the tubular conduit, an optical or a heat sensor and so on.

Device 622 is located down the production line following locator device 621 and timed to act in accordance with indications received from it. In systems wherein the cut off sector are designed to also serve as part of the cited contamination preventing means (see same for FIGS. 4a to 4d), the opening is formed as a thin circumferential groove, while leaving a sector connected to the liquid distributor assembly of the sprinkler. Any professional would understand that forming these openings at the wall of the tubular conduit might be done, for example, using a revolving quasi "glass" cutting means, a laser beam, or a revolving knife.

At the same time it is to be remembered that due to the time consuming nature of forming the openings, while the tubular conduit keeps advancing all the time (being pulled by puller device 614), device 622 might be activated while moving in parallel to and in conjunction with the tubular conduit (and this means that a speed measurement and control circuitry is required, coupled to the puller operation).

Figure 7A:
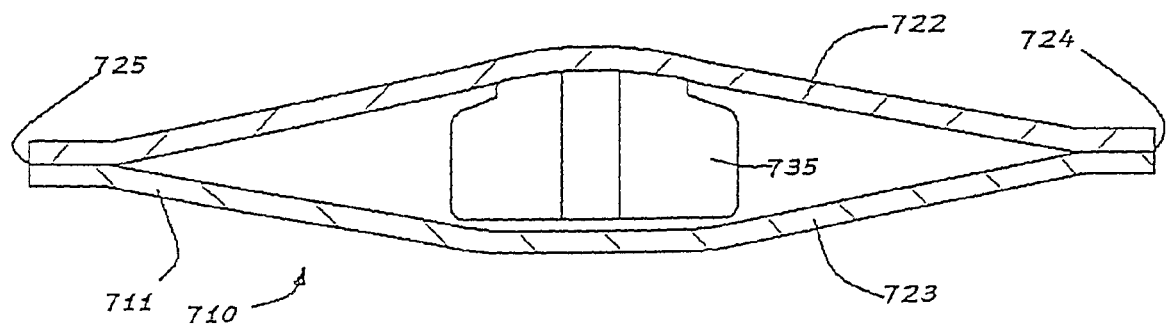
FIGS. 7a, and 7b constitute cross section illustrations of an example of an in-line system of mini sprinklers in accordance with the current invention, wherein the tubular conduit was formed as a tube made of two sheets that were connected flush one to the other at the edges, thus forming a tube with two seams. The two figures describe the tubular conduit (a) before the liquid is driven to flow in it and (b) at the time the liquid is driven to flow.
Figure 7B:
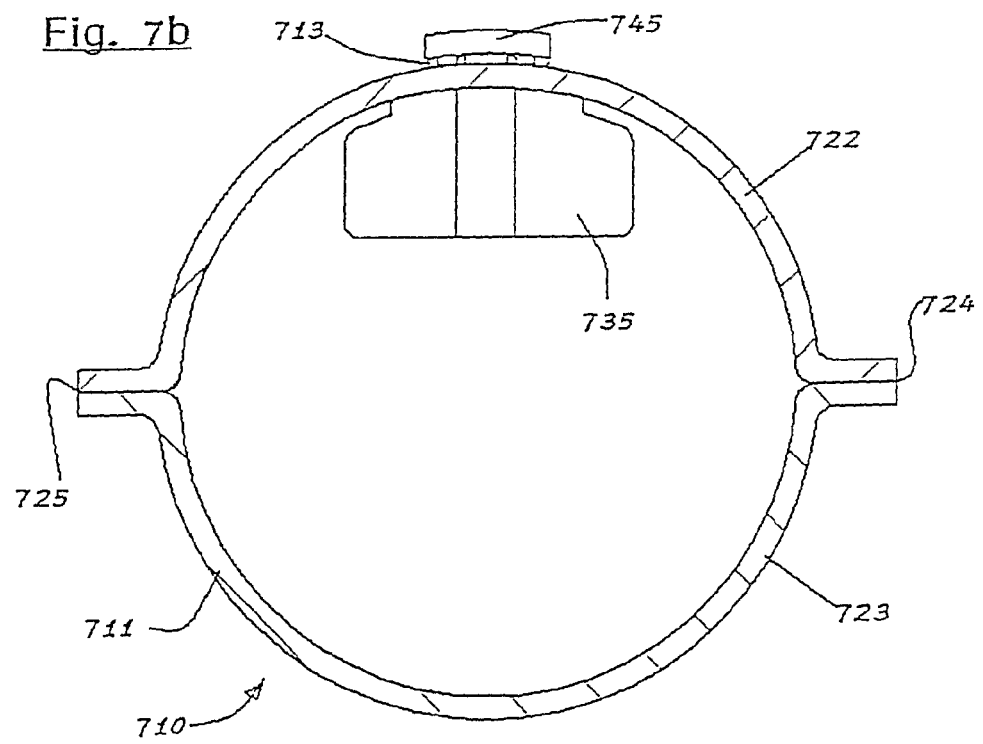

Referring to FIGS. 7a and 7b. The figures show cross section illustrations of an example of an in-line system 710 of mini sprinklers 735 in accordance with the current invention, wherein the tubular conduit 711 was formed as a tube made of two sheets 722 and 723 that were connected flush one to the other at the edges, thus forming a tube with two seams 724 and 725. FIG. 7a shows the tubular conduit 711 before the liquid is driven to flow in it. In FIG. 7b, the tubular conduit 711 is seen swollen with the liquid that filled it up, wherein liquid distributor assembly 745 of sprinkler 735 is protruding from opening 713 outwards to beyond the conduit outer surface area.

Figure 8:
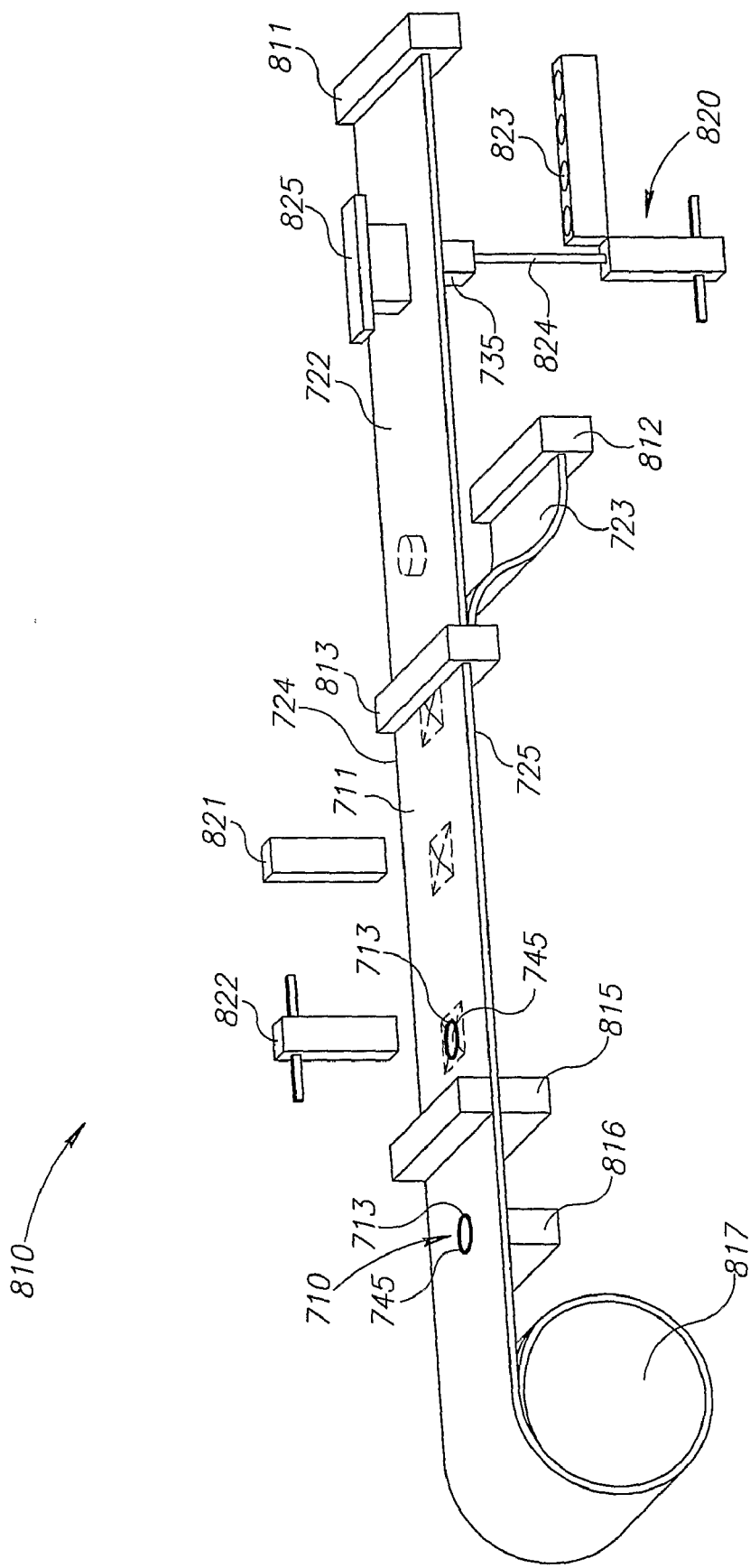
FIG. 8 constitutes a schematic illustration of an example of an array for manufacturing the in-line system of mini sprinklers illustrated in FIG. 7.

Referring to FIG. 8. FIG. 8 constitutes a schematic illustration of an example of a system 810 for manufacturing the in-line system of mini sprinklers 710 that are illustrated in FIGS. 7a and 7b.

Any professional experienced in the extrusion field knows and recognizes systems and methods for continuous manufacturing of a tube made of two sheets that following joining them flush along their lengths while discrete components are mounted to the surface of one of them that would constitute part of the inner surface of the tube (for example, units of drip emitters in case we are describing a line for manufacturing an integral drip line with discrete drip emitters along its length). System 810 comprises, thus, inter alia—first extruder head 811 for manufacturing one of the sheets, 722, second extruder head 812 for manufacturing the second sheet, 723, a device 813 for bringing the sheets 722 and 723 flush together at their length edges (while producing seams at the edges by heat soldering either through exploiting the latent heat generated during the extrusion process or by local heating, or by melting additional material especially for this purpose), a puller 815 and a roller 816.

However, in distinction from other recognized production lines and similar to system 610 that described when referring to FIG. 6, system 810 includes in addition, device 820 for timed feeding of mini sprinkler units 835 and installing them on the surface of sheet 722 (the sheet that after the coupling of the two sheets 722 and 723 one to the other, would constitute part of the inner surface area of tube 711). Additional devices are device 821 for detecting the locations of the mini sprinklers 735 inside the tube, and device 822 for forming openings 713 at the wall of the tube, according to indications received from device 821 (locations detecting device). The openings are formed in a manner that enables the movement of the liquid distributor assembly 745 through the opening as cited, upon the liquid pressure rise inside the tubular conduit, so that the liquid distributor assembly moves and protrudes beyond the outer surface area of the tubular conduit in accordance with the invention.

Device 820 includes means 823 for storing pre assembled sprinkler units 735 and mobile means 824 for transporting sprinkler units 735 to the contact point between them and the surface area of sheet (722 the sheet that after connecting the two sheets 722 and 723 one to the other would constitute part of the inner surface area of tube 711). Mobile means 824 is positioned between the first extrusion head 811 to the second extrusion head 812 and propels the sprinkler units 735 for bringing them in correct directional orientation and at the right timing (in accordance with the advancing speed of puller 814 and the gap that are meant to be received in system 710 between one sprinkler unit to the next one). The sprinkler units thus are positioned on the inner surface area for being soldered by heat to it, wherein as cited after sheets 722 and 723 have been brought together they form the tubular conduit 711. Device 820 might also include support means 825 in order to support sheet 722 at the time sprinkler units 735 are being soldered on it (any professional would also understand that support means 825 might also have mobility capability). The mobile device and the support device can ensure that the sprinkler units would be properly accompanied as long as the mounting of the units on the surface area of sheet 722 was not completed.

Any professional this field would understand that the storage means and the mobile means as cited, dictates integration with automation and control capabilities (for example—a vibrating means leading the sprinkler units to correct location and proper orientation, a piston or a servo motor for feeding the sprinkler units to their designated positions, speed control circuitry linked to the puller down the production line and so on).

Device 821 is located towards the end of the production line, following device 813 that combined the two sheets 722 and 723 together at their edges, producing tubular conduit 711 with two seams 724 and 725. Similarly to the presentation given above for device 621 (referring to FIG. 6), the device detects and locates the positions of mini sprinkler units 735 as they are installed inside tubular conduit 711 and provides correct timing for the operation of device 722 by providing indications of the locations of the sprinkler units.

Device 822, similarly to the discussion above relating to device 622 (referring to FIG. 6), is located on the production line following device 821 and timed to act in accordance with the indications received from it.

Any professional would understand that also a known system for manufacturing a tubular conduit from one sheet that is folded into produce a tube with a single seam (resulting from connecting their length edges) might serve as a basis for continuous manufacturing of an in-line system of mini sprinklers in accordance with the invention, similarly to the production systems that we presented above (when referring to FIGS. 6 and 8). The system would include in addition—a device for timed feeding of the mini sprinkler units and installing them on the surface area of the sheet, that after it being folded would become the inner surface area of the tubular conduit. The feeding device would be positioned between the extrusion head that produces the sheet and the folding device. In addition the system would include devices similar to the manufacturing systems we presented above (when referring to FIGS. 6 and 8).

Referring to FIGS. 9a to 9d. The figures show, in cross section view, the stages of another embodiment of manufacturing an in-line system of mini sprinklers 910 in accordance with the invention, in this example, the mini sprinkler unit 935 was not pre-assembled as was the case before (when referring to FIGS. 4*a* to 4*d*, 5*a* and 5*b*, 6, 7*a* and 7*b* and 8), but rather assembled in stages, during the process of manufacturing the tubular conduit.

The structure of sprinkler 935 and its operation mode are similar to the structure of sprinkler 235 and its operation mode, as they were described when referring to FIGS. 3 and 4*a* to 4*d*, but any professional would understand that it was intended solely as an example, and that an in-line system of mini sprinklers in which the sprinklers installed in it are assembled one by one in a continuum of stages—during the process of manufacturing the tubular conduit, might include mini sprinklers of a different kind of structure and different operation mode.

In the illustrated example, the assembly by stages of a sprinkler unit 935 embedded in tubular conduit 911 that was manufactured by continuous extrusion of a tubular profile is described. But any professional in this field would understand that the described embodiment might also be materialized when the tubular conduit was manufactured from two sheets combined together or from one folded sheet.

Figure 9A:
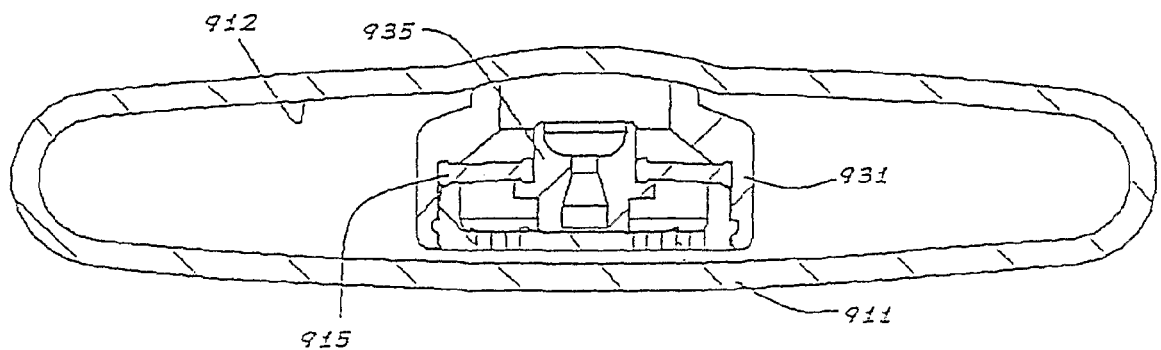
FIGS. 9a to 9d display cross section of the various stages of another embodiment of manufacturing the in-line system of mini sprinklers in accordance with the current invention—wherein the sprinkler unit is assembled in stages, during the and concurrently with the process of manufacturing the tubular conduit (either by continuous extrusion of a tubular profile or by forming it as a tube from two sheets brought flush together at their edges or from a folded sheet).

FIG. 9*a* shows the body assembly 931 of the sprinkler installed on inner wall 912 of tubular conduit 911, wherein at this stage, in the body assembly there is installed only part of the sprinkler's liquid distributor assembly. At this stage only the liquid passage flow rate fixer 936 and the biasing means (in the illustrated example—an elastomer disk 915) are included. Installing the body assembly "as is" (assembled with only the above mention components), might be accomplished by feeding device as we discussed in referring to FIG. 6 (where the subject was the tubular conduit formed by a continuous extrusion of a hollow profile). By the same standards, any professional would understand that if instead we would have been referring to a tubular conduit formed of two sheets or one folded sheet, then the feeding device would be adapted to those embodiments (as such a device was described in referring to FIG. 8).

Figure 9B:
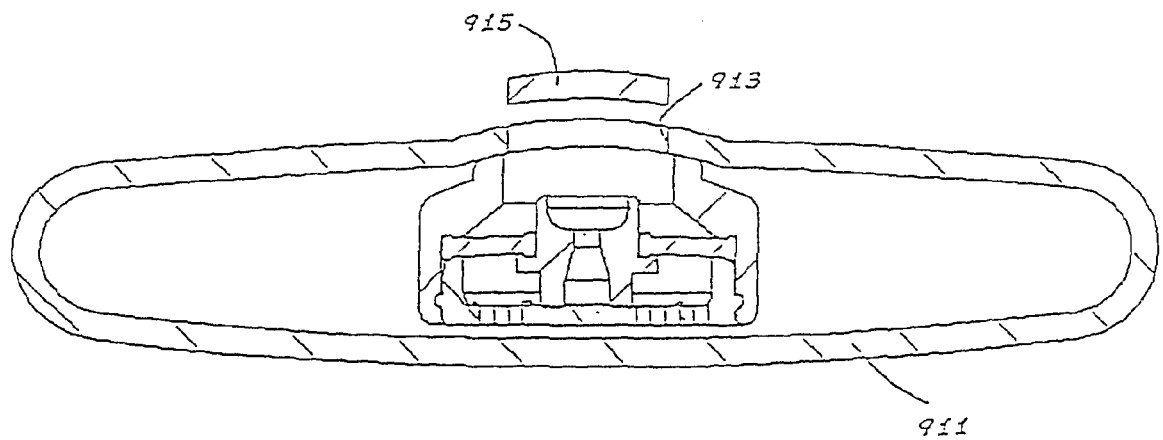

FIG. 9*b* shows the formation of opening 913 in the wall of tubular conduit 911. Opening 913 is formed in such a manner that it would enable later in the manufacturing process to install the distributor component through it, and then—during the system operation time, the movement of the liquid distributor assembly through it when the liquid pressure rises, as in all similar cases. Thus, in accordance with the invention, the liquid distributor assembly would move and protrude beyond the outer surfaces area of the tubular conduit.

In contra distinction to the embodiment of the system illustrated in FIGS. 4*a* to 4*d*, 5*a* and 5*b*, 6, 7*a* and 7*b* and 8, sector 915 that is disconnected from the wall of the tubular conduit in order to produce opening 913, is not used and is removed completely from the system.

Opening 913 might be made by a device similar to a device for forming openings as we presented in referring to FIGS. 6 and 8. At most, as any professional would understand, it is possible to add to the device also means for extracting (for example by vacuum) the disconnected sector 915 and removing it away from the tubular conduit.

Figure 9C:
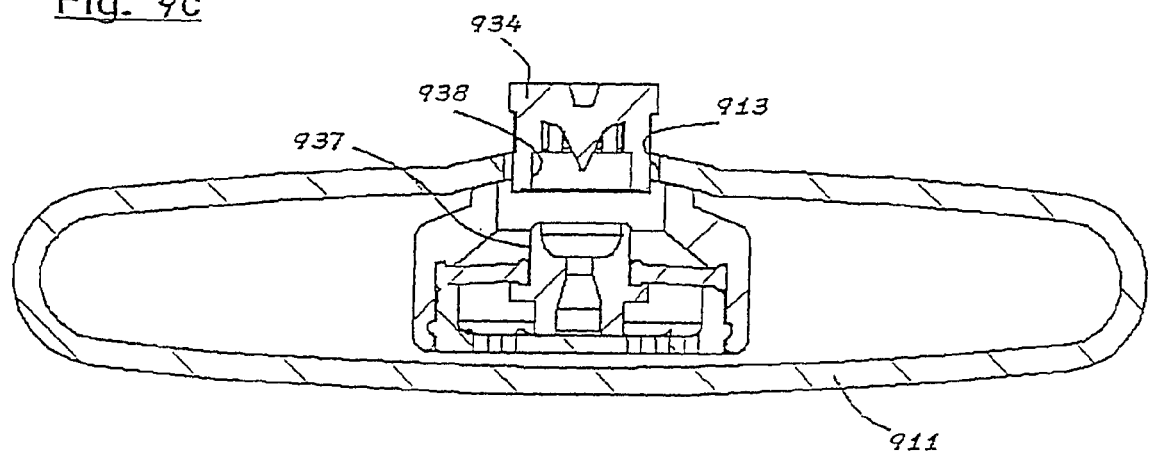

FIG. 9*c* shows the installation of the liquid distributor component 934 through opening 913. Distributor component 934 is manufactured in an embodiment such as a kind of a "piston" with a central passage 938 that is adapted by its dimensions to include in it, by pressured installation, the circumferential wall 937 of the liquid passage flow rate fixer 936.

Installing distributor component 934 through opening 931, might be done using an assembling device that would be assembled as part of the manufacturing system of the tubular conduit, for example somewhere towards the end of the production line, after the device for creating the openings at the wall of the tubular conduit (discussed when referring to FIGS. 6 and 8). Any professional would understand that an assembling device as cited, dictates integration with automation and control capabilities (for example—a vibrating means for advancing the distributor components, a piston with grasping means for installing the distributor components into the sprinkler unit, timing control circuitry linked to the detecting—locating device on the production line, and due to the time consuming nature of the installing procedure—it is to be remembered that the tubular conduit is continually being pulled by the puller and advances all the time, so that the assembling device has to keep moving with it and parallel to it).

Figure 9D:
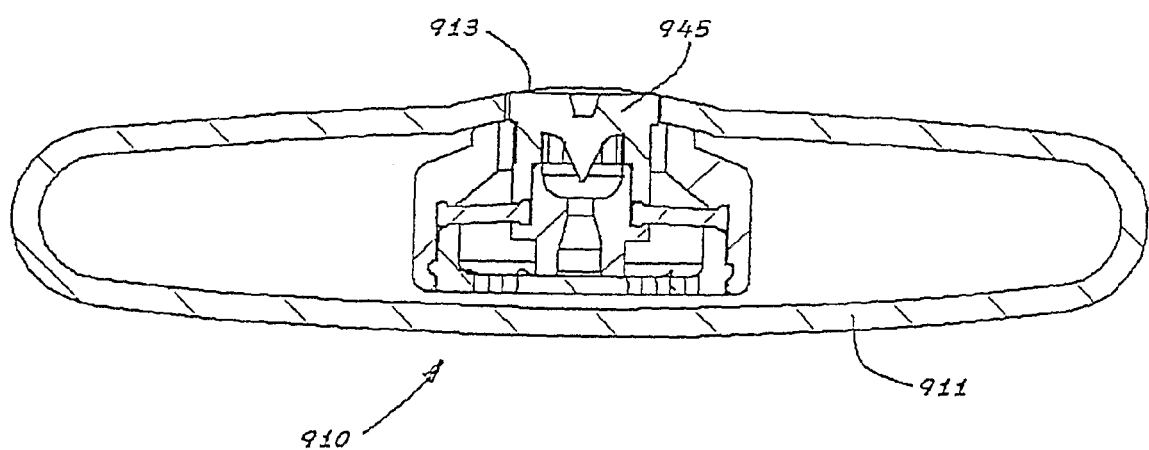

FIG. 9*d* shows the system 910 assembled and ready for operation, wherein the liquid distributor assembly 945 of sprinkler unit 935 is installed and ready to move through opening 913, in a manner that upon liquid pressure increase in the tubular conduit, it would protrudes beyond the outer surface areas of the tubular conduit.

Any professional would understand that removing the disconnected sector 915, as required in order to enable the completion of sprinkler unit 935 assembly in the embodiment described above, does not prevent installation of an efficient means for preventing contaminants from entering the sprinkler unit. Thus for example, the upper end of liquid distributor component 934, the end that moves through the opening in the tubular conduit and protrudes beyond the outer surface areas of the tubular conduit, might be formed with wide edges in accordance with the dimensions of opening 913 into which it returns and converges when the liquid pressure drops in the tube.

It will be appreciated by persons who are skilled in the art, that the present invention is not limited by what has been particularly shown and described above. Rather, the scope of the present invention is only defined by the claims that follow.

The invention claimed is:

1. An in-line system of mini sprinklers, comprising—
   a tubular conduit having inner and outer surface areas, fitted for a liquid flow under pressure through it and formed with at least one opening along its length; and
   at least one mini sprinkler unit that is at least substantially embedded within said tubular conduit, coupled to flow of said liquid within it and mounted to it around said opening, and comprises—
      a mobile liquid distributing assembly movable through said opening, such that when liquid's pressure in said tubular conduit increases, said liquid distributor moves and protrudes beyond said outer surface area of said tubular conduit in order to sprinkle said liquid outwards of said tubular conduit; and
      a body assembly formed with—
         a surface area sector adapted for being mounted upon said inner surface area of said tubular conduit around said opening; and
         an inner volume with said surface area formed around it; and
         a liquid inlet coupled to said inner volume; and
         a liquid distributing assembly installed within said inner volume of said body assembly, being, upon liquid pressure rising in said tubular conduit, mobile relative to said body assembly, in a manner coupling it to flow of liquid into it arriving from said liquid's inlet of said body assembly; and
         biasing means for forcing of said liquid distributing assembly, towards said body assembly; so that when liquid pressure in said tubular conduit increases, propelling of said liquid distributor to move towards and protrudes beyond said outer surfaces area of said tubular conduit and relative to said body assembly, required to overcome said biasing means force; and concurrent with liquid pressure decreasing within said tubular conduit, said biasing means for forcing of said liquid distributor assembly towards said body assembly, propel said liquid distributor assembly to return and move inwards into said tubular conduit and relative to said body assembly;

wherein the biasing means for forcing of said liquid distributing assembly towards said body assembly, comprises an elastomer ring.

2. The in-line system of mini sprinklers in accordance with claim 1, wherein— said liquid is one liquid from a group consisting of—water, water mixed with at least one fertilizing material, and water mixed with at least one detergent.

3. The in-line system of mini sprinklers in accordance with claim 1, wherein— plurality of said mini sprinkler units are embedded within said tubular conduit and located along its length at given gaps between them, and mounted, each of them, around an opening as said.

4. The in-line system of mini sprinklers in accordance with claim 1, wherein— said mini sprinkler unit is mounted on said inner surface area of said tubular conduit.

5. The in-line system of mini sprinklers in accordance with claim 1, wherein— said tubular conduit is formed by continuous extrusion of a tubular profile.

6. The in-line system of mini sprinklers in accordance with claim 1, wherein— said tubular conduit is formed as a tube made of two sheets that were connected flush one to the other at their length dimension edges.

7. The in-line system of mini sprinklers in accordance with claim 1, wherein— said tubular conduit is formed as a tube from a folded sheet.

8. The in-line system of mini sprinklers in accordance with claim 1, wherein— said mini sprinkler is mounted to said tubular conduit around said opening, by hot soldering.

9. The in-line system of mini sprinklers in accordance with claim 1 wherein— the liquid inlet formed in said body assembly is formed with multiple openings and serves as a straining filter.

10. The in-line system of mini sprinklers in accordance with claim 1, wherein— said elastomer ring is anchored at its outer circumference to said inner volume of said body assembly and at its inner circumference is anchored to said outer circumference of said mobile liquid distributing assembly, so that it is stretches during said movement of said liquid distributing assembly beyond said outer surfaces area of said tubular conduit.

11. The in-line system of mini sprinklers in accordance with claim 1, wherein— said biasing means for forcing of said liquid distributing assembly towards said body assembly, comprises—
a springy means.

12. An in-line system of mini sprinklers comprising— a tubular conduit having inner and outer surface areas, fitted for a liquid flow under pressure through it and formed with at least one opening along its length; and at least one mini sprinkler unit that is at least substantially embedded within said tubular conduit, coupled to flow of said liquid within it and mounted to it around said opening, and comprises— a mobile liquid distributing assembly movable through said opening, such that when liquid's pressure in said tubular conduit increases, said liquid distributor moves and protrudes beyond said outer surface area of said tubular conduit in order to sprinkle said liquid outwards of said tubular conduit; and a body assembly formed with— a surface area sector adapted for being mounted upon said inner surface area of said tubular conduit around said opening; and an inner volume with said surface area formed around it; and a liquid inlet coupled to said inner volume; and a liquid distributing assembly installed within said inner volume of said body assembly, being, upon liquid pressure rising in said tubular conduit, mobile relative to said body assembly, in a manner coupling it to flow of liquid into it arriving from said liquid's inlet of said body assembly; and biasing means for forcing of said liquid distributing assembly, towards said body assembly; so that when liquid pressure in said tubular conduit increases, propelling of said liquid distributor to move towards and protrudes beyond said outer surfaces area of said tubular conduit and relative to said body assembly, required to overcome said biasing means force; and concurrent with liquid pressure decreasing within said tubular conduit, said biasing means for forcing of said liquid distributor assembly towards said body assembly, propel said liquid distributor assembly to return and move inwards into said tubular conduit and relative to said body assembly;

wherein— said mini sprinkler unit further comprises— a suction preventing and no drain valve means, that comprises— a sealing means located at the bottom of said body assembly; and a circumferential edge formed around liquid passage flow rate fixer formed in said liquid distributor assembly, so that— said biasing means moves said circumferential edge to a sealing contact with said sealing means, in a manner that it prevents inwards sucking of external bodies at times of closing or opening of liquid pressure at said tubular conduit and prevents as well passage of liquid from liquid inlet formed at said body assembly towards said liquid passage flow rate fixer, and all this as long as said mobile liquid distributor assembly was not yet activated to move due to increase of liquid pressure within said tubular conduit.

13. The in-line system of mini sprinklers in accordance with claim 12, wherein— said sealing means constitutes a sealing ring located within a groove formed at said bottom of said body assembly.

14. The in-line system of mini sprinklers in accordance with claim 1, wherein— a means for preventing contamination entities from entering said sprinkler unit, is formed at the end of said mobile liquid distributor assembly that moves through said opening at said tubular conduit and protrudes beyond said external surface of said tubular conduit.

15. The in-line system of mini sprinklers in accordance with claim 14, wherein—
said means for preventing contamination entities from entering said sprinkler unit comprises—
an upper plane at the end of said mobile liquid distributor assembly that moves and protrudes beyond said external surface of said tubular conduit; and
a sector severed off the wall of said tubular conduit, mounted unto said upper plane; and
wherein said opening in said tubular conduit is formed as a thin circumferential groove that bounds said severed sector from said tubular conduit wall.

16. The in-line system of mini sprinklers in accordance with claim 15, wherein—
width of said circumferential groove is substantially between 0.1 mm to 0.3 mm.

17. The in-line system of mini sprinklers in accordance with claim 1, wherein—
said system comprises, in addition—
means for anchoring said tubular conduit in a manner that said opening would substantially be directed perpendicularly to ground surface.

18. A mini sprinkler unit that is includeable at least substantially within and mountable unto a tubular conduit which is adapted for flow of liquid under pressure in it, that comprises—
a body assembly formed with—
a sector of surface area fitted for mounting unto a tubular conduit in which said mini sprinkler is mountable; and
an inner volume around which said surface area is formed; and
a liquid inlet coupled to said inner volume; and
a liquid distributor assembly installed within said inner volume of said body assembly, which is mobile relative to said body assembly upon liquid pressure increase in a tubular conduit in which said mini sprinkler is mountable, in a manner that it would protrude beyond said outer surface area fitted to be mounted unto said tubular conduit and would couple it to a flow of liquid in it from said liquid inlet of said body assembly; and
a biasing means comprising an elastomer ring for forcing said liquid distributor assembly towards said body assembly, so that—
upon increasing liquid pressure within a tubular conduit in which said mini sprinkler is mountable, propelling of said liquid distributor assembly to move relative to said body assembly requires overcoming said biasing means force; and
with decreasing liquid pressure within a tubular conduit in which said mini sprinkler is mountable, said biasing means for forcing of said liquid distributor assembly towards said body assembly, propel said liquid distributor assembly to move again relative to said body assembly in an opposite direction.

19. The mini sprinkler unit in accordance with claim 18, wherein—
said surface area sectors are adapted for mounting unto the inner surface of a tubular conduit in which said mini sprinkler is mountable.

20. The mini sprinkler unit in accordance with claim 18, wherein—
at least portion of said surface area sector is manufactured from a material that is heat solderable unto a tubular conduit in which said mini sprinkler is mountable.

21. The mini sprinkler unit in accordance with claim 18, wherein—
said liquid inlet that is formed in said body assembly is formed with multi openings straining filter.

22. The mini sprinkler unit in accordance with claim 18, wherein—
said elastomer ring is anchored at its outer circumference to the inner circumference of said inner volume of said body assembly and at its inner circumference is anchored to the outer circumference of said liquid distributor assembly, so that said elastomer ring is stretched during said movement of said liquid distributor assembly relative to said body assembly when liquid pressure increases within a tubular conduit in which said mini sprinkler is mountable.

23. The mini sprinkler unit in accordance with claim 18, wherein—
said biasing means for forcing said liquid distributor assembly towards said body assembly, comprises—
a springy means.

24. A mini sprinkler unit that is includeable at least substantially within and mountable unto a tubular conduit which is adapted for flow of liquid under pressure in it, that comprises—
a body assembly formed with—
a sector of surface area fitted for mounting unto a tubular conduit in which said mini sprinkler is mountable; and
an inner volume around which said surface area is formed; and
a liquid inlet coupled to said inner volume; and
a liquid distributor assembly installed within said inner volume of said body assembly, which is mobile relative to said body assembly upon liquid pressure increase in a tubular conduit in which said mini sprinkler is mountable, in a manner that it would protrude beyond said outer surface area fitted to be mounted unto said tubular conduit and would couple it to a flow of liquid in it from said liquid inlet of said body assembly; and
a biasing means for forcing said liquid distributor assembly towards said body assembly, so that—
upon increasing liquid pressure within a tubular conduit in which said mini sprinkler is mountable, propelling of said liquid distributor assembly to move relative to said body assembly requires overcoming said biasing means force; and
with decreasing liquid pressure within a tubular conduit in which said mini sprinkler is mountable, said biasing means for forcing of said liquid distributor assembly towards said body assembly, propel said liquid distributor assembly to move again relative to said body assembly in an opposite direction,
wherein—
said sprinkler comprises in addition—
a suction preventing and no drain valve means, that comprises—
a sealing means located at the bottom of said body assembly; and
a circumferential edge formed around liquid passage flow rate fixer formed in said liquid distributor assembly, so that—
said biasing means moves said circumferential edge to a sealing contact with said sealing means, in a manner that it prevents inwards sucking of external bodies at times of closing or opening of liquid pressure at the tubular conduit in which said sprinkler is mountable and prevents as well passage of liquid from liquid inlet formed at said body assembly towards said liquid passage flow rate fixer, and all this as long as said mobile liquid distributor assembly was not yet activated to move due to increase of liquid pressure within said tubular conduit.

25. The mini sprinkler unit in accordance with claim 24, wherein— said sealing means constitutes a ring located within a groove formed at the bottom of said body assembly.

26. The mini sprinkler unit in accordance with claim 18, wherein— said sprinkler comprises in addition— means for preventing contamination entities from entering said sprinkler unit that is formed at the end of said liquid distributor assembly.

27. The mini sprinkler unit in accordance with claim 26, wherein— said means for preventing contamination entities from entering said sprinkler unit, comprises— an upper plane at the end of said mobile liquid distributor assembly that moves and protrudes beyond said external surface of a tubular conduit in which said sprinkler is mountable.

28. The mini sprinkler unit in accordance with claim 27, wherein— said upper plane formed in said liquid distributor assembly, includes a protruding circumferential ring for mounting unto the inner surface area of the tubular conduit in which said sprinkler is mountable.

29. The mini sprinkler unit in accordance with claim 27, wherein— said upper surface formed in said liquid distributor assembly is manufactured from a material that is heat solderable unto the tubular conduit in which said sprinkler is mountable.

* * * * *